United States Patent [19]

Klein et al.

[11] Patent Number: 5,405,159
[45] Date of Patent: Apr. 11, 1995

[54] HIGH EFFICIENCY BICYCLE SUSPENSION

[75] Inventors: Gary G. Klein; Darrell W. Voss, both of Chehalis, Wash.; Lonney Pauls, Estacada, Oreg.

[73] Assignee: Klein Bicycle Corporation, Chehalis, Wash.

[21] Appl. No.: 268,883

[22] Filed: Jun. 30, 1994

Related U.S. Application Data

[63] Continuation of Ser. No. 946,060, Sep. 18, 1992, abandoned.

[51] Int. Cl.[6] ............................................. B62K 21/14
[52] U.S. Cl. ............................ 280/283; 280/288.4; 74/551.2
[58] Field of Search ............... 280/284, 283, 275, 276, 280/285, 286, 288.4, 279, 280; 74/551.1, 551.2

[56] References Cited

U.S. PATENT DOCUMENTS

| | | | |
|---|---|---|---|
| 524,389 | 8/1894 | La Casse | 74/551.2 |
| 589,820 | 9/1897 | Doig et al. | 74/551.2 |
| 651,591 | 6/1900 | Brintnell | 74/551.2 |
| 1,171,169 | 2/1916 | Carter | 188/307 |
| 1,318,052 | 10/1919 | Carter | 188/307 |
| 1,358,315 | 11/1920 | Joel | 297/215 |
| 1,468,835 | 9/1923 | Rosen | 74/551.2 |
| 1,622,912 | 3/1927 | Johnson | 74/551.2 |
| 2,324,403 | 7/1943 | Kühn | 74/551.2 |
| 2,790,520 | 4/1957 | Kuhn, Jr. | 188/307 |
| 3,598,424 | 8/1971 | Crouch et al. | 280/7.14 |
| 3,625,539 | 12/1971 | Crouch et al. | 280/102 |
| 4,420,989 | 12/1983 | Finkle | 74/551.2 |
| 4,519,591 | 5/1985 | Bush et al. | 267/158 |
| 4,723,639 | 2/1988 | Hungerford | 188/307 |
| 4,768,630 | 9/1988 | Aubrey et al. | 188/307 |
| 4,773,514 | 9/1988 | Gustafsson | 188/310 |
| 4,934,724 | 6/1990 | Allsop et al. | 280/281.1 |
| 5,181,436 | 1/1993 | Lai | 74/551.2 |
| 5,186,074 | 2/1993 | Arnold | 74/551.2 |

Primary Examiner—Margaret A. Focarino
Assistant Examiner—Kevin Hurley
Attorney, Agent, or Firm—Jim Zegeer

[57] ABSTRACT

A bicycle having an improved suspension system including a rotary damper and composite springs. Springs which closely control the direction of allowable movement in the suspension preclude rocking, twisting or unwanted lateral deflections.

21 Claims, 12 Drawing Sheets

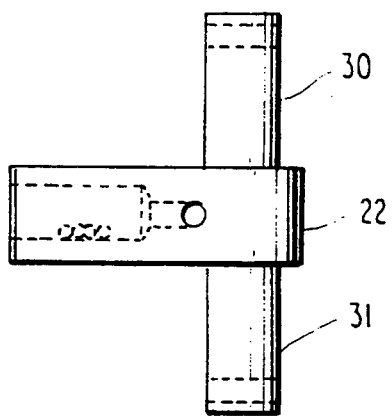
 
FIG.6d   FIG.6e
FIG.6a
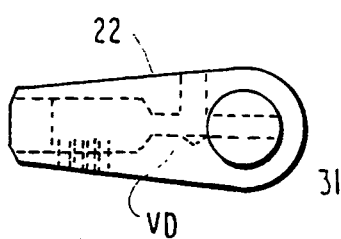
FIG.6b
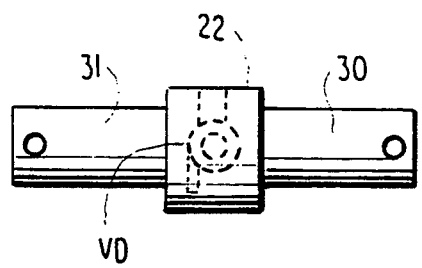
FIG.6c
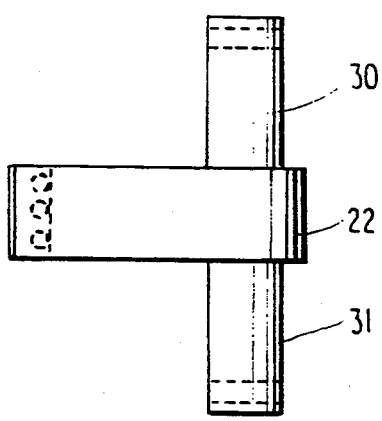
FIG.7a
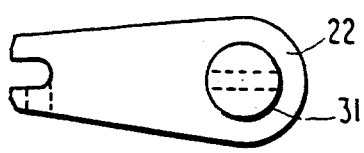
FIG.7b
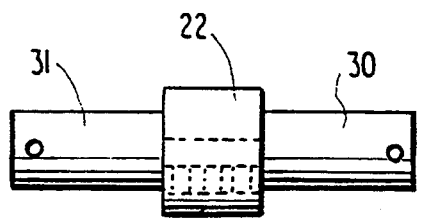
FIG.7c

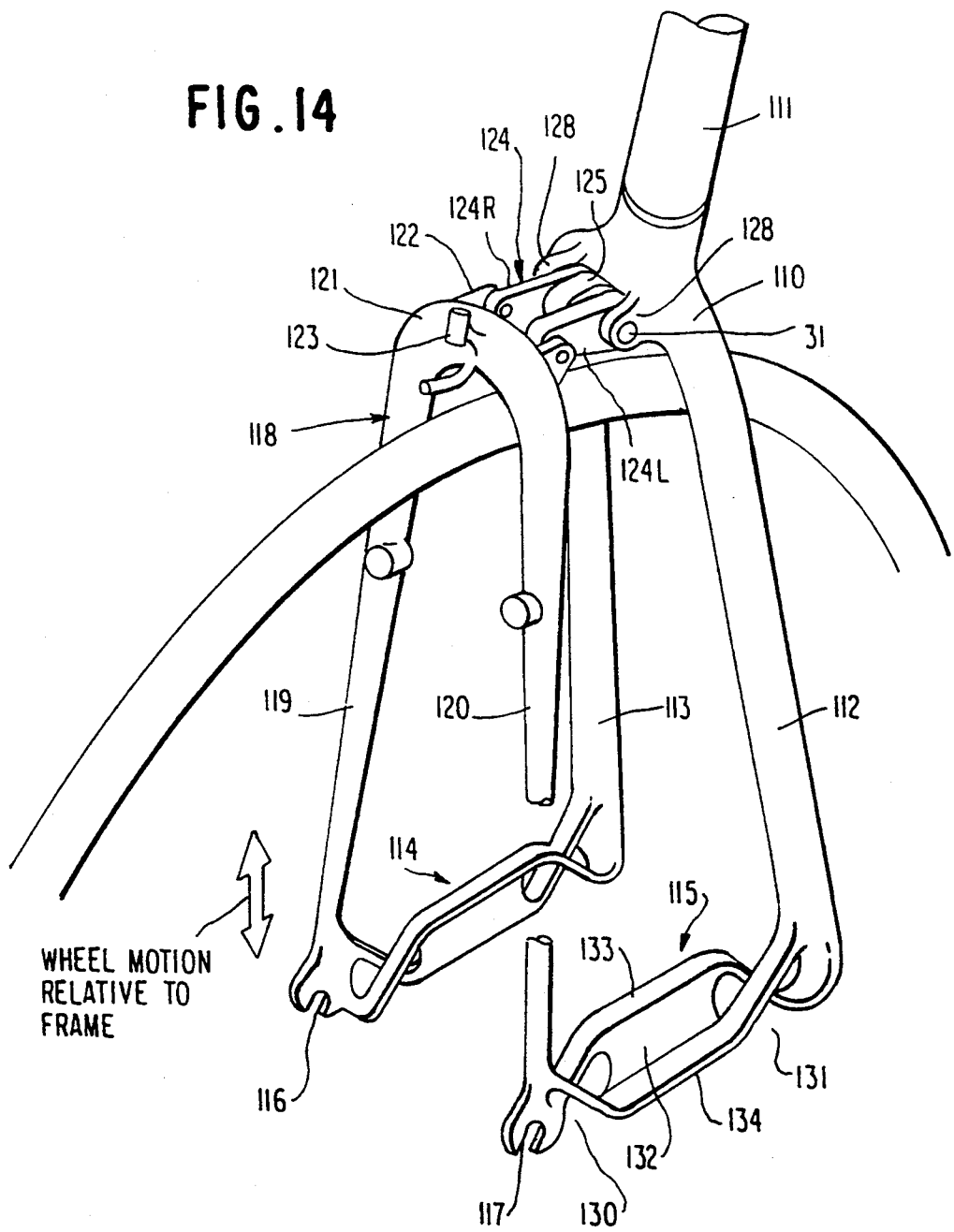

HIGH EFFICIENCY BICYCLE SUSPENSION

This is a continuation of application Ser. No 07/945,060, filed Sep. 18, 1992, now abandoned.

The invention relates to a compact, high performance, lightweight, very low static friction suspension system for the seat, handlebar and front and rear wheels of a bicycle or other vehicle with positive geometry control of the suspended motion and utilizing an optional optimized low static friction rotary or linear liquid shock absorber design with variable fluid logic damping or a low static friction variable magnetic damping. The invention as applied to the saddle also allows for convenient vertical, horizontal and angular adjustment of the saddle without effect on the suspension movement itself. The invention as it applies to the handlebar can allow for convenient length and height adjustment of the handlebar. The saddle and handlebar devices further can fit on a standard 'existing' bicycle frame without modification. A less expensive version of the invention also uses low static friction controlled movement, but instead of the rotary or linear hydraulic type shock absorbers uses a combination of springs and elastic polymer devices to control damping and travel of the unit. Similar articulations are applied. Even the suspension without oil damping performs in a superior manner to prior art.

The suspension system including spring pivots, with very low static friction fluid logic shock absorbers, could be used to provide improved ride, stability, traction and noise control on all types of vehicles.

The early prior art includes many examples of sprung saddles, sprung forks and sprung handlebars from many years back. Typically these consist of metal pivots and rubber, leather or metal spring elements. None of these are currently regarded as high performance or competition suspension devices. Generally the old designs are very heavy compared with the equivalent structure in a modern racing bicycle. More recent prior art includes a saddle suspension composed of a long double fiberglass or carbon fiber cantilever spring with a bonded rubber layer between the springs for damping, with weight of 1020 grams and a linear hydraulic shock absorber with internal spring built into a seat post for suspending the seat with a weight of 812 grams in steel, 625 grams in aluminum and 575 grams in titanium. Except for the one recent design, most seat post suspensions have about 2 to 4 cm of total suspension travel. By way of comparison, a typical high quality mountain bicycle seat post weighs about 250 grams, a road seat post less than 200 grams. So a weight penalty of 300 to 400 grams or more is the cost of a few cm of seat travel. The referred to recent design, although heavier, has substantial seat travel, on the order of about 8 cm (it is hard to tell exactly since there are no travel limits built into it).

Concerning handlebar suspensions currently on the market, there is a handlebar made of a rubber like material. This design flexes in all the wrong directions as well as the right one to a couple of handlebar stem designs which pivot off of the front of the steerer tube and allow the bars to pivot in a forward and downward motion. These use a polymer device, metal spring or combination of the two as both a load supporting spring and damping medium. Typical weights of these stems range from 580 grams for an all titanium model handlebar to 526 grams for a steel stem only. These units have less than 2 cm of usable travel. Some stems weigh 600 to 700 grams and have a travel of about 5 cm. For reference a Klein Mission Control TM, sold by the assignee hereof, has a stem length of 135 mm and an assembly weight of 355 grams.

Front forks have seen more recent development from the old Schwinn type leading or trailing pivot designs utilizing a metal spring. The more modern units make use of sliding tube construction, similar to a modern motorcycle. Some of these use dual sliding fork blades, with air or mechanical springs and hydraulic or mechanical friction damping. Some front forks use a sliding fit in the head tube again with an air or mechanical spring and a hydraulic or mechanical friction damping. One recent design incorporates a leading link design with 11 mechanical bushing pivots and a typical linear pressurized air/oil shock absorber unit mounted in front of the head tube. In another fork (using a leading link mechanism), the only mechanism tying the left side with the right is the standard front hub axle. This design requires the use of a relatively heavy front disc brake. In most of the above suspension forks, both high static friction and poor mechanism stiffness (in torsion and cantilever bending modes) result in poor suspension response, loss of steering and directional control loss of pedalling energy during climbing or accelerating. In the units with less static friction, but with poor stiffness, the result feels sort of like riding on a flat or partially deflated front tire, with a vague or sloppy steering response. Most of the front suspension forks have a total travel of less than 5 cm.

One of the big problems with bicycle suspensions is the wear life of the suspension unit. The sliding type seal designs work and last well on a car or motorcycle by using a relatively high contact pressure seal. The sliding type seals are much more difficult to make work on a bicycle because the bicycle mass is so much less and the seal and bearing friction must be also proportionately low. For example, if the bicycle is 24 pounds, and the motorcycle is 350 lbs, the bicycle static friction would be 0.07 or 7% that of the motorcycle proportionately. So far many of the seal and bearing designs have either been short in longevity or have unacceptable static friction or both. One of the most popular forks has required frequent rebuilding due to wear and contamination.

One prior art commercial seat suspension has a very sensitive action in the desired direction, which feels and works very well on small bumps or repetitive small bumps such as a rocked-road. But the lack of adequate damping, geometry control and travel limits cause the rider to lose control under vigorous multiple bump conditions. Also the design does not adequately control the lateral, torsional and angular motions of the saddle, because of its extended flexible beam configuration. Furthermore, this configuration significantly reduces the rider clearance upon dismounting, which is not desirable.

Another recent prior art saddle suspension design utilizes a telescoping spring and hydraulic device for energy absorption. This design was found to be very insensitive to the vibration response of the frame. The static friction from the sliding hydraulic seals and the sliding load supporting bushings require a substantial bump to cause any suspension movement. Furthermore, the nature of the sliding mechanism is such that it has considerable fore-aft and side to side play in it. The rider loses the feeling of control of the bike through the saddle.

We have determined through testing and evaluation that any suspension or suspension component as relates to a bicycle needs the following features to be truly superior:

Lightweight in total
Lightweight on unsuspended portions
Durable
Wear resistant
Absence of "play" or looseness in the pivots
Rigid or resisting deflection in all directions except the desired direction of suspension travel.
Substantial amount of travel
Smooth, damping method which allows easy travel on small deflections, with increasing resistance as deflection and velocity increase.
Zero or substantially zero static friction, supple feel.
Adjustable damping curves, preferably while in use.
Fluid or damping medium with minimum temperature effects.
Damping resistance curve which increases at a smoothly diminishing rate at high velocities
Simplicity, minimum of components, fasteners and wear surfaces.
Minimize forward energy lost to bumps
Minimize pedalling energy lost by suspension resonance and absorption
Supple suspension at handlebars and seat
Firmer suspension at wheels
Return the tire tread to the ground quickly for best traction, or even better, keep it on the ground with consistent pressure.
Cushion the bike and the rider from stress and shock
Cushion and protect the tires and wheels from impacts.
Do nothing to cause the rider to lose control, steering or balance of the bike.

The objects of the invention are to provide an improved lightweight suspension systems and components thereof, particularly useful for bicycles and applicable to all four isolation units in a bicycle suspension system: handlebar, saddle and front and rear wheels.

The above and other objects, advantages and features of the invention will become more clear when considered with the following specification and accompanying drawings wherein:

FIG. 1 is a diagrammatic illustration of an idealized bicycle suspension system, FIG. 2 is an exploded isometric view of the zero or low friction rotary damper or shock absorber employed in preferred embodiments of the invention, FIG. 3 is a diagrammatic sectional view of the rotary damper shown in FIG. 2, FIGS. 4a, 4b, and 4c are detailed illustrations of a DeLaval nozzle design according to the invention (dimensions given in each embodiment are exemplary), FIGS. 5a, 5b and 5c illustrate a modification of the wiper block flow control passage of FIGS. 4a–4d wherein the DeLaval nozzle is provided with sharp orifices, FIGS. 6a, 6b, 6c, 6d and 6e illustrate details of a further modification wherein a vortex diode is incorporated with the DeLaval nozzle, FIGS. 7a, 7b and 7c illustrate details of a further modification wherein a mechanical check valve is incorporated with the DeLaval nozzle, FIG. 8 are curve plots of stroke velocity vs. damping force and illustrate the effect of the fluidic head-type on damping characteristics, FIGS. 9a and 9b illustrate stroke dependent damping characteristics, FIG. 10 illustrates damping force vs. stroke displacement curves for the preferred embodiment, FIG. 11a is an exploded diagrammatic illustration of the handlebar shock isolation system incorporating the invention; FIG. 11b is a diagrammatic illustration of the assembled unit; and FIG. 11c is a sectional view thereof, FIG. 12 is a diagrammatic illustration of a seat suspension incorporating the invention, FIG. 13 is a diagrammatic illustration of a rear wheel suspension incorporating the invention, and FIG. 14 is a diagrammatic illustration of a front wheel suspension incorporating the invention.

DETAILED DESCRIPTION OF THE INVENTION

Figure 1:
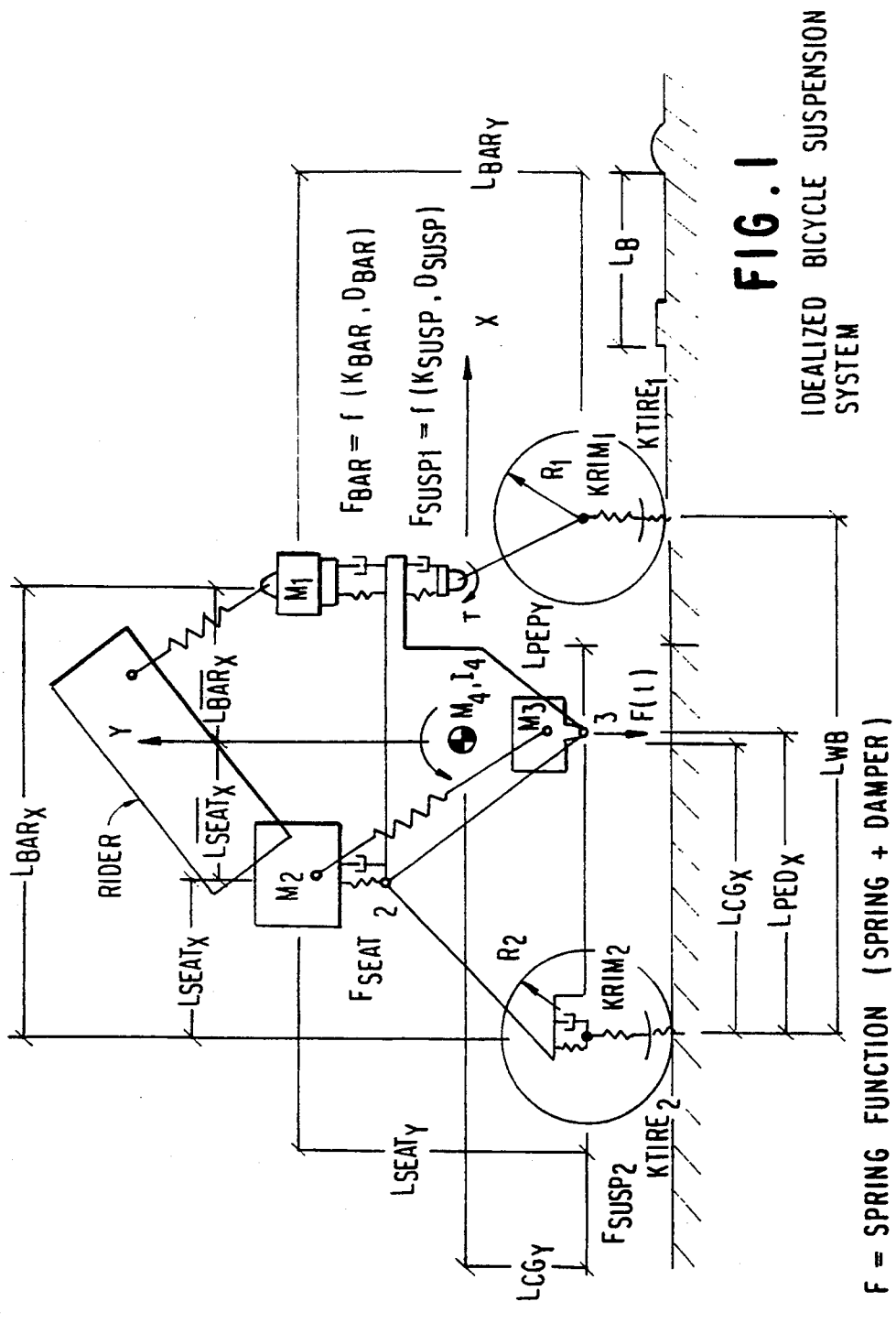

Light weight is important on a bicycle. The complete suspension mechanism installed should not increase the weight of the bicycle appreciably. A top quality all terrain bicycle with full working suspension should weigh under 25 lbs. A top quality road bicycle should weigh in at under 21 lbs. A top quality tandem should weigh in at under 36 lbs (road), 40 lbs (all terrain). According to the invention:

Static friction (the amount of force necessary to begin movement) should be low enough to permit the suspension to work effectively in most all conditions.

The spring rate needs to be optimized to the load, suspension travel, excitation and damping conditions. It is generally desirable to have a relatively low spring rate in the normal working portion of the suspension, with progressively higher rates coming in at the top and bottom portions of the travel, to prevent bottoming out or over-travel under extreme bumps or rebounds. Typically, a suspended load in combination with a spring will oscillate at a resonant frequency $F_r$. For a spring rate K expressed in pounds$_{force}$ per inch of travel and a load M in pounds$_{mass}$, the $F_r = (K*384/M)^{.5}/(2*PI)$. For bumps or excitations below this frequency, the load M will exhibit little isolation from the bump. In other words, the load will follow the bump. As the frequency (or speed) of the bump increases to the resonant frequency $F_r$, the load-spring combination begins to resonate with the excitation frequency, traveling farther than the bump height, even to the condition of oscillating wildly out of control if insufficient damping is present. At frequencies (or speeds) higher than the square root of 2 times $F_r$, the load begins to exhibit isolation from the bump. The suspension is working. Although a certain amount of damping is required to control and damp out repeated oscillations, in general, the higher the level of damping, the less isolation from bumps will result.

The suspension system on a bicycle has some unique problems. The pedalling motion of the rider can also induce unwanted movement and/or oscillations. The bicyclist will typically pedal between 40 and 100 revolutions per minute, each revolution consisting of two pedal strokes. Thus the cyclist is normally inducing frequencies between 1.3 and 3.3 hertz. In a sprint, the competitive cyclist can spin up to 130 revolutions per minute for a very short duration, which is 4.3 hertz. The bumps, on the other hand, can range from about 5 hertz for a large bump at low speed to more than 50 or 60 hertz for a small bump at high speed. If we were dealing with a strictly mechanical spring system, the minimum $F_r$ would need to be substantially larger than 3.3 hertz in order that pedalling would not induce unwanted oscillations or movement of the suspension system. Designing $F_r$ substantially higher than 3.3 hertz would put it up into the low frequency portion of the bump range. This is not desirable either. The low frequency bumps could then induce oscillation into the suspension system. If $F_r$ were raised to be above the normal operating range of bump frequencies, it would not respond at all to the bumps we are trying to damp. Fortunately, there is a way around the problem. By using multiple suspension actions and both intelligent variable and human damping means, a very efficient and high performance suspension system can be created. For example, with suspension actions at the handlebar and front fork, we can tune the system to greatly reduce the possibility of oscillation. The handlebar is only affected by the weight on the hands, with a relatively small input of pedalling forces. Its $F_r$ can be tuned down close to or below the pedalling frequency range-without ill effect. The front fork, on the other hand, takes a substantial amount of the pedalling forces, along with the hand forces of the handlebar. It is best tuned to a frequency above the pedalling frequencies. The same type of tuning works for the seat suspension and the rear wheel suspension. The seat will best be tuned to a lower frequency and the rear wheel will use a much stiffer spring rate to achieve a higher frequency.

The rear wheel suspension requires special attention. The high compressive forces on the chainstays and particularly on the right chainstay created by the chain tension need to be designed for (see Klein U.S. Pat. No. 4,621,827). The chain tension varies with the pedal position significantly. Also, particularly when the rider is climbing out of the saddle, but even to some degree when the rider is seated, the rider has a tendency to pounce on each pedal stroke, or load the bike in a downward fashion. This up and down loading is not without purpose. It allows the rider to apply more impulse power to the pedal in its best position, and as the rider creates an impulse of pedal power, he also creates additional down force on the rear wheel, creating additional traction to accept the power impulse. Further, with the power impulse, the bike accelerates on each pedal stroke, also shifting weight to the rear wheel and enhancing rear traction.

In a sprint, the rider will shift his or her weight forward over the front wheel, and may still experience the front wheel lifting off of the ground slightly at the peak impulse of each pedal stroke. For a specific gear ratio, road condition, pedal impulse, bike geometry and rider down force impulse, there will be a vector angle such that the chain tension will balance the downloads on the rear wheel. If the suspension linkage to the rear wheel in the equilibrium condition is at that angle, there will be no net suspension movement due to that pedal impulse. If the angle is too flat, the bike will compress, if the angle is too steep, the chain tension will (using some of the rider's energy) lift the bike. Unfortunately, this balance angle does not stay the same for all conditions. It varies directly with the front and rear gears used. It varies with the angle of the road or trail. It varies with the geometry of the bike and with the rider's position on the bike. If the rear spring rate used is very high, then even if the applied force to the linkage is off angle slightly, it will result in very little added deflection. Also, if the pedal or chain forces are low, and the applied force angle is very different than the linkage, the low forces will result in little added deflection. So the linkage angle is best tuned so as to be in the region of most likely high pedal impulse use, with a relatively high spring rate, in order to minimize lift or dive of the bike under pedal loads and keep to a minimum the pedalling energy absorbed by the rear wheel suspension.

The angle of impulse force, measured from the ground, ranges from about 10 to about 22 degrees for most conditions with substantial power output. Road bikes are most likely to be in the 10 to 16 degree range and mountain bikes will more likely be in the 14 to 22 degree range. The optimum linkage angle for a road racing bike is about 13 degrees under normal resting load. The optimum linkage angle for an off road bike is about 18 degrees under normal resting load. Some of the suspension mountain bikes on the market have achieved angles close to or within the desired range. They have pivoted the rear chainstays in a vertical plane from the seat tube, and in order to clear the tire and the front derailleur, have placed the pivot above or in front of the front derailleur, achieving an angle of about 13 degrees, and 20 to 30 degrees for most others. The prior art bikes with steeper angles, such as at 26 degrees, do not provide suspension under power. Chain tension lifts the bike until the suspension linkage hits its upper stop, locking it out. Most of the pivoted chainstay bikes have poor lateral and torsional rigidity between the head tube and the rear wheel.

The invention uses rigid spring pivots to effect an articulation of the rear dropouts without creating loss of torsion and lateral stiffness or play in the frame. Rigid spring pivots are available commercially in a cylindrical package constructed with stainless steel cross springs. The available springs in an appropriate size package for a bicycle are either too weak to take the loads involved or too limited in rotation angle to provide the movement desired or both. The commercial spring pivot takes less and less radial or axial torque load as it is deflected at increasing angles. The invention incorporates spring pivots as part of the structure of the suspension or bike frame. By eliminating the cylindrical package, size and weight are reduced. By starting in the unloaded condition with a spring with small reverse curve, when deflected the spring straightens out and has full radial and axial load capability at its normal working deflection position, or when the radial loading will be at its maximum. A multiple beam spring can be designed with springs of varying reverse curvature to provide essentially constant load capability over a range of deflection. The commercial spring pivots are straight in the unloaded condition where their load carrying capability is highest. The invention also incorporates springs designed with composite fiber construction to provide more energy storage for a given size and weight, and much greater combination of deflection angle and load capability than the commercially available metal spring pivots. Glass fiber composite has about one fourth the modulus of steel, with comparable flexural strength. S-2 glass fiber epoxy composite has flexural strength up to 220 ksi with modulus in the fiber direction of 7,900,000 psi. Compared to the modulus of steel at 30,000,000, the fiberglass can deflect 3.8 times as far as the steel without failure, storing in the process 3.8 times as much energy. Thus, the fiberglass spring is more efficient than steel on an energy storage per weight basis. The best metallic spring material may be high strength titanium alloy. It achieves a strength of about 150 ksi with a modulus of about 15–16 ksi and a density about half that of steel. The fiberglass spring as above is only 2.8 times more efficient on an energy storage volume basis, and is more efficient on an energy storage per weight basis.

A further advantage can be obtained by utilizing multi modulus composite spring construction. For example, the fiberglass beam when deflected has its outermost layers in the highly stressed condition, and the inner layers are stressed proportionately less as they approach the center of the spring thickness. The inner layers are kind of loafing, and the outer layers are doing most of the work. If we use a higher modulus material such as carbon or boron fiber in the middle plies of the spring, the middle layers will store more deflection energy than the glass they replaced, because of their higher modulus. In addition, some materials such as the carbon fiber, are much lower density than the glass fiber they replaced. By using a multi modulus spring, both the energy storage in a given volume of spring, and also the energy storage per weight can be improved. In the case of the preferred embodiment, this results in a spring with a higher energy storage and a lighter weight over a straight glass fiber spring. The glass fiber, carbon and boron as used in the preferred embodiment are merely indicative of the type of advantage which can be achieved. Other fibers such as Spectra TM, Kevlar TM, silicon carbide and so forth could also be incorporated to advantage. However, in most cantilever and beam spring designs, the material used must be able to handle compressive and tensile loads. Some of the fiber composite materials are not especially strong in compression, such as the Kevlar and Spectra. According to the invention, when materials are used, they are placed in areas which see predominately tension stress.

The springs can be optimized for a particular applied load direction by lengthening and thickening the spring member oriented in the direction of load only. This creates an extra strong spring in a particular direction. This can be used to advantage for example on the chainstay structure which has a high compression component along the length of the chainstay, due to the high tension loading in the bicycle chain under hard pedalling forces. The strong spring pivot pair linkages are located in back of and slightly above the bottom bracket. The relatively horizontal spring members are much more substantial in order to take the compression stresses of the chainstay than the vertical stabilizing spring members. This is an important feature of the rigid spring pivots, that they can be optimized for a particular stress direction. The spring pivots and chainstay assembly is tucked in out of the way of the riders feet, yet clears the bicycle wheel and chain. The linkage then extends downward and backward toward the rear dropouts at an angle from the center of the forward spring pivot to the center of the rear spring pivot of about 18 degrees with the cyclist sitting on the bike for a mountain bike or about 13 degrees with the cyclist sitting on the bike for a road bike. The dropout is connected to a lightweight seat stay assembly which is connected at the top to either another spring assembly or preferably the optimized rotary shock. In some applications a leaf or beam type spring or springs will provide suitable locating stiffness and geometry control and may be desirable for other reasons such as space limitations, cost to manufacture or assemble or low air resistance (aerodynamics) or aesthetic considerations. This will generally be true when torque forces will not be transferred through the spring but supported in some other manner. For example, if a single direction beam type spring is used for the rear wheel suspension, then each chainstay will have two flex springs oriented so as to flex in the vertical plane, but with the connecting link between them at the appropriate said angle to the ground. The chain side springs and linkage could be made stronger than the non-chain side in order to optimize the structure and minimize weight. The in-plane orientation of the rear wheel would be maintained by a specially designed shock absorber or other spring or linkage assembly up on top of the seat stays, which in turn are rigidly connected to the rear dropouts, keeping the wheel straight with the rest of the frame.

There are some problems with composite springs which do not ordinarily show up on normal metal springs. They are the result of the anisotropic nature of the fiber composite material. Composite springs have to be carefully designed so as not to create large delaminating loads between plies. Also, a composite spring with fibers oriented only in the axial or zero degree direction will not have much resistance to side loadings, torsion or other splitting types of failure. If the spring is designed so that it has a significant reverse curvature under a high deflection loading condition, it will be difficult to keep the plies from delaminating. A moderate reverse curvature is used on the preferred embodiment springs in their unloaded condition, at which point they are under little or no stress, such that as load is applied, the springs straighten out and go into forward curvature, which forces the plies into each other. The combination of loading stress and reverse curvature is never high enough to cause delamination of the springs. Where the fiber composite may have a tensile or compressive strength of 250 ksi or higher (for carbon), the interlaminar bonding strength of the matrix resin may be only 15 ksi for example.

Another way in which the composite springs are strengthened is by reinforcement in other fiber directions. For example, the spring can be wrapped with a unidirectional fiber 90 degrees to the axis of the spring, to help maintain the springs shape and keep it from splitting apart under varying loads. The 90 degree orientation will not provide any appreciable increase in the energy storage capability of the spring as the fiber is oriented orthogonal to the bending stress. We have also found it useful to incorporate in the very center layers of a composite spring plus and minus 45 degree layers of typically a high modulus high strength carbon fiber material to provide shear strength and stiffness under lateral loadings of the springs. This type of loading is very important in some of the suspension structures utilizing the rigid spring pivot concept. It provides lateral and torsional rigidity for the front fork suspension assembly, the handlebar suspension assembly, the seat suspension assembly and the rear wheel suspension assembly. The shear layer in the center is not critical with respect to 45 degrees, but could range from 30 to 60 degrees without adverse affect.

Another feature of the invention as incorporated into the springs is the method of handling the spring stress at the ends. Typically springs can fail where they are clamped or fastened into a structure due to the high strain in the clamped spring and stress riser resulting from the spring end configuration. For example, the composite spring clamped between two pieces of steel is not a happy long life spring, unless it is operating well below its maximum stress capabilities. The glass fiber outer layers of the spring are subjected to large strain rates, up to and including the ends. The steel is 3.8 times more rigid than the glass fiber composite, and concentrates and increases the loading on the fiber layer in direct contact with it. This can be buffered by incorporating a thin tapered metal sleeve to reduce the structural stiffness of the metal clamping Joint, and further compensated for by bonding the outer layer of glass fiber to the metal structure with a tough but flexible adhesive such as 3M company film adhesive. These measures will reduce the stress concentration of the end joint and improve .the life of the spring, but the best method of supporting the spring at its ends is by supporting the highly stressed outer layers with additional fiber material of similar or lower modulus in order to distribute the shear stress between the layers so as not to create any undo stress risers or fail the binding matrix material. The preferred form of this end joint involves a gradual increasing of the fiber layers supporting the basic spring layers, creating a tapered thickened end shape. After sufficient layers of the equal or low modulus fiber material to distribute and buffer the high stress areas of the spring, the remainder of the reinforced end joint can be made with higher modulus material such as carbon fiber or reinforced with metal structure as appropriate.

Suspension travel is very important. The suspension devices with one eighth or one quarter inch of real usable travel do not provide any real advantage. The suspension function of the tire is much greater than that. Any suspension travel less than one-half inch for the road or 1 inch for off road or all terrain is not very desirable. The invention contemplates about one inch of travel for each member in road configuration except maybe less for the rear wheel and about double that for off road.

Damping means is extremely important. Preferably, damping should be able to be tuned to the particular application and even to the particular rider. It should be proportioned to the degree of velocity or severity of bump. It should also vary with the position of the suspension. It should be smooth. It should not exhibit static friction. Damping devices disclosed herein have extremely low friction. In some cases it is advantageous for the damping mechanism to have different damping curves for compression than rebound. It should be relatively constant with varying temperature. The damping mechanism should be able to dissipate the energy it absorbs without detrimental temperature rise. The damping mechanism should be sealed or protected in such a manner so as not to be subject to rapid deterioration by dirt and the environment or leaking of its internal fluid. Optionally the damping means could have a bypass passageway, controlled externally, for adjusting the shock to varying conditions as the rider would like it.

For example, when climbing up hill, it is most efficient if the front and rear wheels can move relatively freely in order to follow the ground contour and maintain best traction. If the shock is damping the movement significantly, it is eating the energy needed to climb with, and not really helping traction either. If the suspension can be freed up so that the shock provides minimal or only a small amount of damping, the bike will climb even better than an unsuspended bike (currently regarded as the best to climb with). Conversely, when descending, the shock absorber is necessary to control the motion and rebound of the suspension action, otherwise, the suspension oscillates and rebounds out of control.

The ideal suspension function is to keep the tire in even pressure contact with the ground, or as close to even pressure contact as possible. On the bicycle with a very limited power plant, another function is to keep as much of the forward momentum energy from becoming wasted bump energy as possible. The suspension system must have a restoring force so as to return it to its balanced, static or equilibrium position after being pushed or disturbed. When the wheel rolls onto a bump, at first, the tire deflects and begins to accelerate the wheel and everything attached rigidly to it upwards. The force and duration of the acceleration are determined by the height and slope of the bump, the forward velocity of the bike, the deflection verses force behavior of the tire, and the weight of the wheel and everything attached rigidly to it. The energy to accelerate the tire, wheel, etc. upwards has to come out of the forward momentum of the bicycle. The invention seeks to minimize this energy loss in most cases for a bicycle.

The second thing that happens is that the accelerating unsuspended mass attached to the wheel begins to compress the suspension components, and due to the spring rate and compression damping forces, the suspended mass begins to be accelerated by the additional force above the static force in the suspension members.

The third event occurs as the bicycle frame and fork are being accelerated upwards by the combination of the increase in suspension spring force due to displacement from neutral position and the damping force due to suspension travel velocity in the frame and fork suspensions. For small or medium displacements the secondary acceleration of the bicycle frame will be much lower than that of the wheels. For large displacements, which reach the travel limits of the suspension device, the acceleration of the bicycle frame will increase with displacement and velocity and will reach the acceleration of the wheels at the upward travel limits of the primary suspension, i.e. when the suspension has bottomed out.

The accelerating bicycle frame will, in turn, begin to accelerate the handlebars and saddle through their respective suspensions. Again, the acceleration will be dependent upon the increased spring force from compression of the handlebar and seat springs combined with the damping force generated by the damping mechanism. As these two members will use relatively low spring rates compared to the frame and fork suspensions, they provide a great deal of isolation from the small and medium bumps, and take the harshness out of the larger bumps.

Note that the typical bicycle saddle itself is in effect a suspension device. The relatively thin nylon or polyethylene shell with a thin foam cover and light weight wire saddle support frame all contribute to suspension function. The rails, shell and foam all flex under an applied load, even a so called hard racing saddle can flex where the cyclist sits about one half inch under a hard bump condition. This was very evident in a carbon fiber-/epoxy saddle shell, which although it was very light, was also much more rigid than a typical racing saddle shell. The carbon fiber shell gave an extremely harsh ride on a standard bicycle and seat post.

The first way to reduce the energy loss is to provide a very supple lightweight tire with a large deflection capability. This will reduce the upward accelerating force on a small bump and delay the maximum upward accelerating force on a large bump. The tire selection has to be balanced between suspension function, traction, weight, rolling resistance, and wind resistance.

The next way to reduce the energy involved in the upward motion of the bump is to reduce the mass of the components being accelerated upwards. The invention at each place does an excellent job of this. In each case, there is the weight of the tire and wheel, and a minimum weight structure and the least number and lightest weight of necessary components rigidly attached to the wheel (in the direction of suspension action). Wherever possible, the unsuspended portion of the bike is made as light as possible, and any component which can be functionally located in a suspended configuration is so located.

For instance, on the suspension saddle, the preferred embodiment has the saddle clamping, along with the front to back and tilt adjustments, and the major mass of the suspension springs, and the body and major mass of the rotary shock and its linkage connected to the suspended portion of the device. Only the lightweight seat post and mounting pivots are completely unsuspended in this device.

Similarly, in the preferred embodiment suspension handlebar, the major mass of the rotary shock and linkage is mounted up inside the handlebar stem to minimize the unsuspended mass.

The tuned suspension system needs to be able to respond at a high speed in order to effectively cushion the rider and return the tire to the ground as quickly as possible. Some of the prior art polymer damped suspension systems seem to have a sluggish response in returning the tire to the ground.

The suspension system should allow the suspension motion to occur only in the plane of the bicycle or motorcycle, or in the case of the front wheel or handlebars, only in the plane containing the wheel and the steering axis. The rigidity in all other directions should be very high for a high performance handling and feel. Many prior art suspension systems perform poorly in this respect.

The un-suspended portion of the bicycle should be as light as possible, for low energy absorption upon hitting a bump and fast return of the wheel to the ground after clearing the bump. Some prior art suspension systems with cast shock absorber bodies and other heavy hardware attached to the wheel dropouts have a relatively high degree of un-suspended weight. As a result, the tire tends to bounce off the ground and provides poor traction.

The invention in the preferred configuration as it relates to the seat comprises a composite cantilever spring, with a separate linkage to a rotary hydraulic fluid logic shock absorber. The combination of spring and rotary shock results in a very low static friction design, exhibiting the desirable properties of the Alsop in this regard, but with automatic fluid controlled variable damping, variable spring rate, positive geometry control and travel limits. The result is more than an order of magnitude improvement in efficiency and rider control. The rotary shock uses antifriction sealed ball bearings for the pivot, and the small diameter rotary seals have greatly reduced friction compared to the sliding seals of a conventional linear shock absorber. Because of the small diameter of the seal surface compared to the relatively long moment arm of the shock actuator, the force required at the end of the lever arm to move the seal on the small diameter shaft is a small fraction of the seal drag at the shaft. This, combined with the very low friction pivots, results in an almost friction-less design.

SHOCK ABSORBER DESCRIPTION

As indicated earlier, an important part of this invention is the shock absorber. Without a shock absorber, the suspension system becomes much less effective as a vibration and shock isolator over a broad frequency range. At near-resonant conditions, with inadequate damping, the suspension system can actually become an amplifier, introducing large displacements and forces to the suspended mass. To avoid this, an energy absorbing device is introduced into the system to smooth out the responses over a broad range of excitation frequencies.

A shock absorber is basically a device that dissipates vibrational energy. This energy dissipation can be a function of displacement, velocity, stress, and combinations of these and other factors. Typically, the damping forces are generated by the hydraulic action of a fluid passing through an orifice or a series of orifices, usually pressurized by a piston that is activated by the displacement of the suspension system. For automotive applications where the suspended mass is relatively large and the natural suspension frequency relatively low, good shock isolation can be achieved even with relatively poor damping characteristics. However, for bicycle applications where the rider is more directly coupled to the structure (both in an active and passive sense), the damping characteristics are more critical. One claim of this invention is an advanced shock absorber device for bicycle and other lightweight vehicle applications. The following sections describe this device and discuss how the device can be made to achieve the desired energy absorbing characteristics for application in bicycle suspension systems.

DESIRED SHOCK ABSORBER CHARACTERISTICS

The bicycle suspension system is basically made of up to four isolation units. These are: the handle-bar, the saddle, and the front and rear wheels. In a fully suspended bicycle, the frame actually "floats" between the rider contact points (handle-bar and saddle) and the wheel isolation units, as illustrated in FIG. 1. The degree of isolation is dependant on the number of isolation units active in the system. The quality of ride and the effectiveness of the suspension system in shock isolation will depend on the spring and damping characteristics of the active isolation units.

There are several primary design goals for bicycle suspension systems. These design goals may be categorized under five main headings, namely:
1. Vehicle stability and control
2. Riding comfort
3. Minimize structural damage to vehicle
4. Minimize weight and cost
5. Reliability and low maintenance

VEHICLE STABILITY AND CONTROL

For competition cycling, stability and control are critical considerations in a suspension design. A key design requirement here is to keep the wheels on the ground (prevent tire hop). It is difficult to accelerate, steer, brake or control the bike in any other manner while the wheels are airborne. The damper is a critical item in the suspension system to accomplish this.

Tire "hop" in bicycles can occur from several sources. It can occur from too little or too much damping in the wheel isolation units and it can occur from too little damping in the rider isolation units (or both). To illustrate, consider for the moment the idealized suspension system in FIG. 1. Assume that the idealized suspension is completely frictionless (i.e., no dampers in the system).

From a suspension design point of view, the shock loading of a bicycle frame occurs when the front and rear tires encounter a series of bumps in a roadway. Generally, the loading from the front and rear tires do not occur simultaneously but a time lag exists between a bump impact with the front tire and the same bump impacting the rear tire. This time delay is a function of the vehicle speed and the vehicle wheel base (Lwb—FIG. 1). Because of this time delay, the general motion of the bicycle frame will be a combined rotational (rocking) and vertical (pogo) action where the frame oscillates between the ground and the rider contact points. Without friction in the system this movement can become dangerously out of control if the speed of the bicycle and the spacing of the bumps are such that the impulse energy occurs at or near a fundamental frequency of the suspension system. In this mode, the wheels will be off the ground a great deal of the time (tire hop) and the control capability of the bike will be extremely compromised.

The purpose of the shock absorber is to reduce the oscillatory movement of the frame by dissipating some of the stored energy in the shock isolation units. If the damper units are properly "tuned" the movement of the frame can be minimized thus reducing the tire "hop" problem. However, it is necessary to consider all of the active isolation units for optimum wheel control. For example, adding damping only in the wheel isolation units will help the tire "hop" problem but the frame (plus wheels) can still oscillate undamped between the rider contact springs and the pneumatic tires (which are basically undamped springs). The key point to be raised here is that the ideal damper design must be one that can be "fine-tuned" (adjusted) for optimum wheel control over a given range of vehicle speeds and riding terrains.

RIDING COMFORT CONSIDERATIONS

Riding comfort for bicycles and other lightweight vehicles is considerably more limited than for automobiles. The most that can be hoped for in bicycle suspension design is to minimize the acceleration response of the rider for a given riding environment. This can be done by optimizing the spring and damping characteristics of the shock isolation units. Impacts with large bumps as well as the harsh vibrational environment induced by rough road conditions must be considered in the suspension design. Impacts by large bumps are best isolated by large spring displacements and high damping rates whereas isolation from high frequency vibrations (much higher than the fundamental frequency of the suspension) is best handled with a small amount of damping. This seemingly conflicting requirement can be accommodated by a stroke dependant damping unit, where a small amount of damping is provided for small oscillations (around the equilibrium point) but progressively higher damping provided for larger oscillations. Our invention accommodates this requirement. How this is accomplished is discussed in a later section.

Another consideration for riding comfort is the suppleness of the suspension during normal, smooth operations. Static friction in a suspension system gives an undesirable rough "feel" to the system. Static friction is generally introduced into the system by damper seals and mechanical tolerances that cause rubbing of adjacent parts. In this invention, steps are taken to minimize static friction. For the rotary damper, discussed later, this is somewhat inherent in the design due to the mechanical advantage of the driving linkage. A linkage with a mechanical advantage of 10, for example, will experience a net reaction load of 1/10 of the static friction load. For linear dampers special low friction seals must be used to minimize the effects of static friction. Our linear damper design is discussed in a later section.

STRUCTURAL CONSIDERATIONS

High structural loading of a bicycle frame occurs when the front and/or rear tires impact discontinuities in the roadway. They can also occur from a hard landing following a jump. The detrimental effects of these loadings can be minimized by an experienced rider who can anticipate and react to these conditions. However, there are situations where a cyclist (experienced or not) cannot react quickly enough to prevent overloading of the frame (e.g., rough road at high speeds). In these situations, the frame, handle-bar and fork loads can build rapidly if the bicycle is inadequately suspended. Even if suspended, high frame loads can be introduced if near-resonant conditions exist (with an inadequate amount of damping) or if there is not enough damping in the system to prevent the suspension springs from "bottoming-out" during a hard landing. The damper unit is thus an important force limiting device for suspended bicycle frames.

The optimum damper characteristics required for single and multiple bump impacts are not the same. For single impacts, a minimum amount of damping is desirable to allow full excursion of the suspension system without "bottoming" the suspension springs and to allow the springs to return their energy back to the ground on the downhill side of the bump and recover the otherwise lost forward energy. However, for multiple impacts a higher amount of damping is needed to prevent uncontrolled resonance. These requirements point to the need for an adjustable damper unit that can be externally adjusted by the rider "on-the-fly" to accommodate the riding environment.

WEIGHT AND COST CONSIDERATIONS FOR BICYCLE SUSPENSION SYSTEMS

Weight and cost are extremely important design considerations for bicycle suspension systems. Important factors here include material selection, fabrication methods and simplicity of design for-ease of manufacturing and assembly.

DESIGN CONSIDERATIONS FOR RELIABILITY AND LOW MAINTENANCE

The majority of the bicycle suspensions currently on the market are not adequately designed for high reliability and low maintenance. Some of these systems provide a level of shock isolation for a period of time but are unable to withstand the less than ideal off-road conditions involving rough terrains and harsh environmental conditions (mud, water, snow) and the hard, rough handling by the competition cyclist. The shock absorbing units are the most critical parts of the suspension system, from the standpoint of reliability and low maintenance. Linear shocks are susceptible to fluid leakage because of the highly exposed seal surfaces and their tendency to pit over time. Our invention utilizes a rotary damper for the preferred design. Rotary dampers have less tendency to entrap foreign debris and the seal surfaces are much more protected than the linear damper design. As a consequence, the rotary damper is inherently more reliable from the standpoint of fluid containment. Our rotary damper design is discussed in the next section. We also have an improved linear damper concept which will minimize the leakage problem. This damper design is discussed later.

THE ROTARY SHOCK ABSORBING DEVICE

General Description

Figure 2:
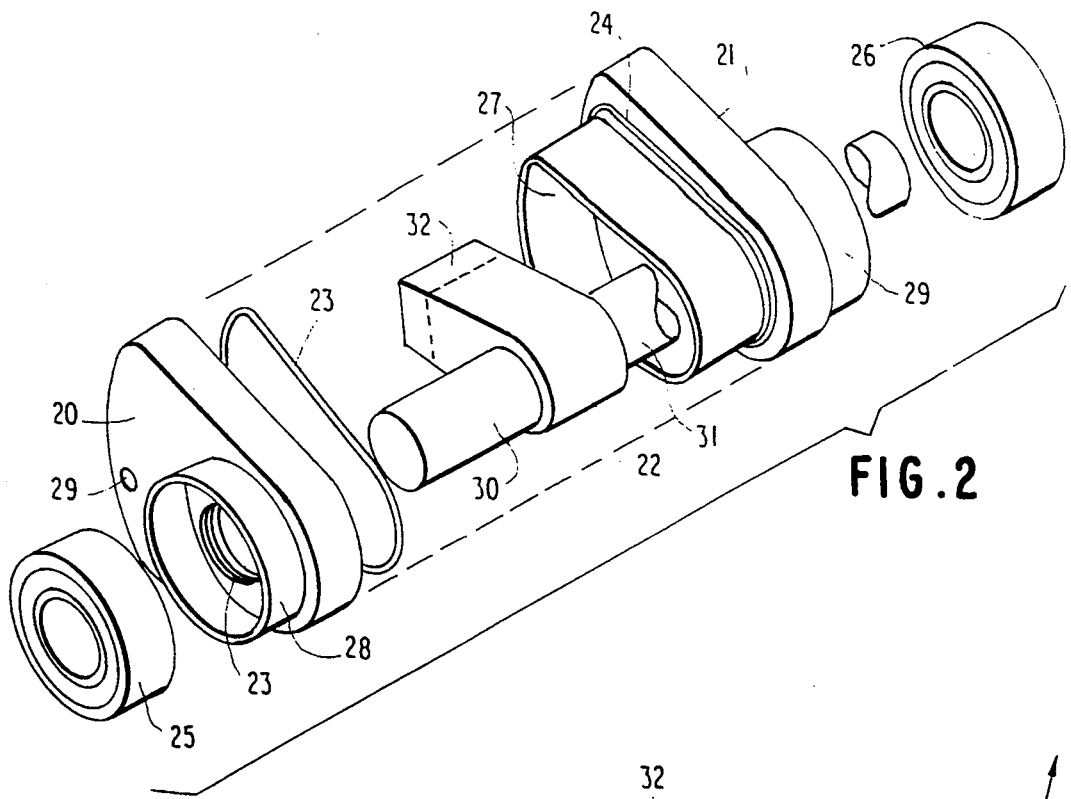

The rotary shock absorbing device is the preferred shock absorbing unit for this invention. FIG. 2 is an exploded view of the device, showing its key working parts. The rotary shock includes a housing assembly 20 and 21, a wiper blade unit 22, several "o-ring" seals 23 (3) and two sealed, precision ball bearings 25 and 26.

The damper housing 20 and 21 form the oil cavity or chamber 27 when the device is assembled. The left 20 and right 21 halves of the unit are aluminum forgings with some machining required to form the "o-ring" surfaces 24 and the bearing pockets 28. These parts could also be made of reinforced plastic materials reinforced for added weight savings. It should be noted that the geometry of the housing in FIG. 2 is for the seat shock absorbing device. Other applications (e.g., handle-bar, front and rear wheel shock isolation units) require a similar housing but with a different exterior geometry to accommodate the specific attachment points. The housing is assembled by installing the wiper blade unit 22, the "o-ring" seals 23 (3) and bonding the right and left sides of the housing using a carbon/epoxy material. A filler hole 29 is provided on the damper housing for filling the device with damping fluid.

The wiper blade unit 22 is the moving part of the damper that generates the damping force and it is actuated by one or more shafts 30 and 31 in bearings 25 and 26. The damping force is generated by the wiper unit displacing fluid in front of the blade and forcing the fluid into the lower pressure area behind the blade. This part is an aluminum forging with precision machining required to form the fluidic head 32 and the bearing-/seal shafts 30 and 31. The wiper blade unit rotates in two sealed, precision ball bearings 25 and 26. The housing may include a needle valve NV controlled by-pass passage BP may be used for adjustment purposes. This passage may be controlled remotely for active damping control. Needle valve NV can have a knurled handle for grasping between thumb and finger to rotate same. Alternatively, the handle can be in the form of a pinion NVP which is rotated by rack NVR, which is remotely translated by control cable NVC, which extends to a convenient position for the bicyclist.

Figure 3:
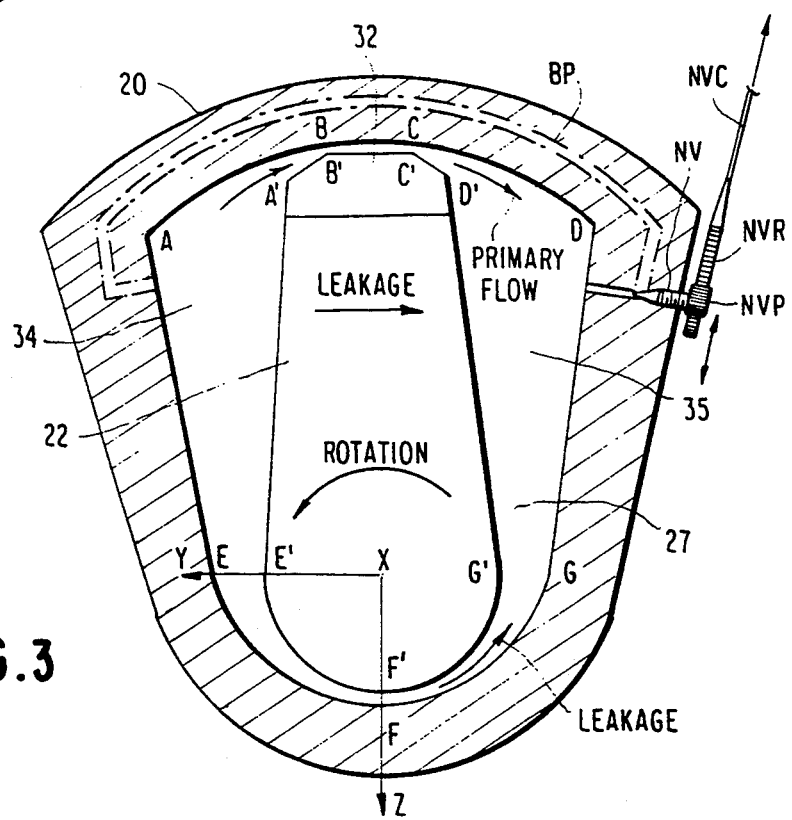

FIG. 3 illustrates how the rotary damper works. The figure is a section through the damper housing 20. The wiper or blade unit 22 is shown rotating counter-clockwise, giving a high pressure zone 34 in front of the wiper blade and a low pressure zone 35 behind the blade. The high and low pressure zones set up a flow of fluid through the device in the direction of the arrows. The flow consists of two parts, the primary flow through the fluidic head 32 and a secondary flow as leakage around the remaining parts of the wiper unit (see FIG. 3). The amount of leakage is kept to a minimum by a close tolerance on the mating surfaces E-F-G AND E'-F'-G' (FIG. 3) and the bottom and top surfaces of the wiper blade (not shown). The primary flow is through the fluidic head, designated by the mating surfaces A-B-C-D AND A'-B'-C'-D' (FIG. 3).

The net damping moment produced by the rotary damper unit can be expressed as, $$M_{damp} = PRESS_h * \int r * dA_h - PRESS_l * \int r * dA_l$$

where, $M_{damp}$ = Damping moment (in-lbf)
$PRESS_h$ = High fluid pressure (psig)
$PRESS_l$ = Low fluid pressure (psig)
$dA_h$ = Differential Area, High pressure side (in ^2)
$dA_l$ = Differential Area, Low pressure side (in ^2)
r = Distance of Differential Area Relative to Axis of Rotation of Wiper Arm (in)

The pressure differential in the device (hence, the damping force) is controlled by the configuration of the fluidic head 32 and the geometry of the wiping surface of the housing unit, A-B-C-D (FIG. 3).

The fluidic head 32 is an integral part of the wiper blade unit and is created by machining or molding of the wiper blade unit. The purpose of the fluidic head is to control the primary flow of fluid. The fluidic head is basically an arrangement of orifices and/or contoured and ramped surfaces to form the fluid duct connecting the high and low pressure zones of the damper. Four types of fluidic heads are:
De Laval nozzle
Sharp edge orifice
Vortex diode
One-way mechanical check valve
FIGS. 4 thru 7 are design details of these fluidic head types.

Figure 4A:
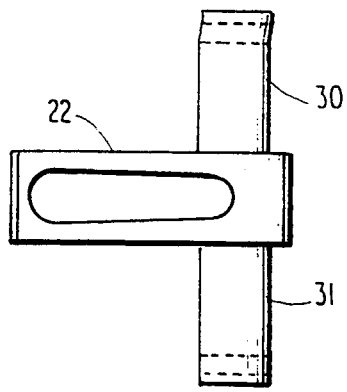
Figure 4B:
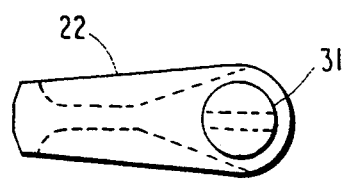
Figure 4C:
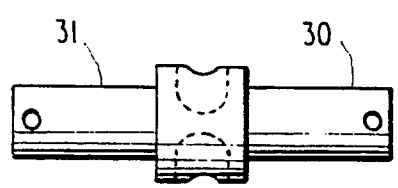

De Laval Nozzle (FIG. 4)

The De Laval nozzle is the preferred embodiment of the damper. The wiper blade design for this concept is shown in FIG. 4. (The dimensions are merely exemplary in each of the embodiments shown in FIGS. 4–7). This is a converging-diverging nozzle that can accommodate both subsonic and supersonic flows in the fluidic head. While compressible or incompressible fluids could be used, the De Laval nozzle used in conjunction with a compressible fluid described later herein, can produce a damping force v.s. velocity curve similar to Curve A in FIG. 8. This curve represents the function,
Fdamp=C*V ^ n
where,
C=damping coefficient
V=stroke velocity
n=velocity exponent In practice, the velocity exponent for De Laval nozzles can be around 0.7. This gives a rather "gentle" damping curve (even for high stroke velocities) due to the built-in force-limiting tendencies of the function.

SHARP EDGE ORIFICE (FIG. 5)

Figure 8:
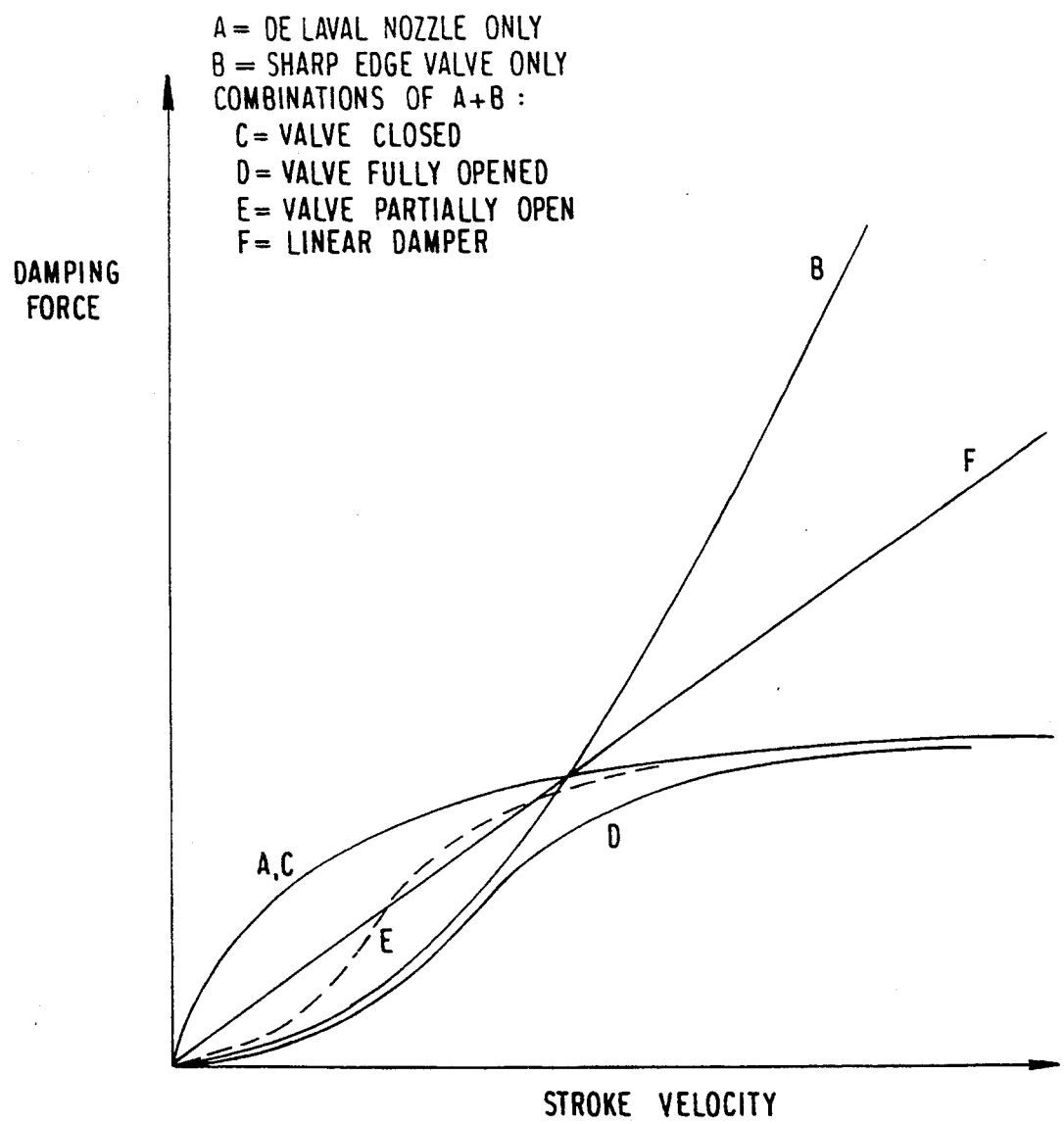

Complex automotive shock absorbers use one or more staged pressure relief valves to attempt to provide a similar type of damping response as the De Laval nozzle. The problem with using a drilled hole in a piston as the fluid restriction is that a sharp edged hole in a plate has a velocity exponent of 2 or greater. This means the shock does almost nothing on small bumps, and comes in strong on a large bump. Curve B in FIG. 8 is characteristics of this type of damper. Automotive shocks also typically provide more damping on the rebound than on the compression stroke. They use one way check valves to accomplish this. Again, they are protecting the shock absorber. While a vehicle may see a very hard upward impulse, as from a large bump taken at high speed, the rebound force is limited to the force the vehicles springs exert on the unsuspended components, and the rebound rate is limited by how quickly the springs can accelerate the unsuspended components back down to the ground.

An intermediate type of fluid restriction passage is the long tube with smooth ends. If the flow through the tube is laminar, the pressure velocity curve will be linear where the pressure drop (hence, damping force) is proportional to velocity. Curve F in FIG. 8 illustrates this type of damper.

Figure 5C:
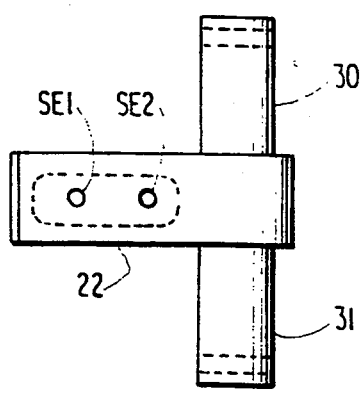
Figure 5B:
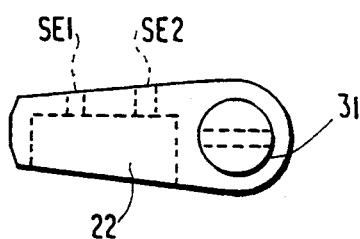
Figure 5C:
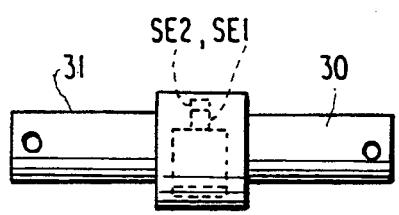

The wiper blade design for the sharp-edge orifice concept is shown in FIGS. 5a, 5b and 5c. Two sharp edge orifices SE1 and SE2 are shown. As discussed above, this device will have pressure related to damping proportional to velocity squared or higher (see Curve B, FIG. 8). The sharp edges create turbulence. This type of response will tend to provide nearly undamped motion in small displacements, and extreme damping in large displacements. This type of response by itself is not particularly useful, but used in conjunction with other damping means or controls, it can work to advantage.

VORTEX DIODE (FIG. 6)

The vortex diode is a fluidic device that functions as a check valve, without moving parts. It uses an induced vortex to check the flow in one direction. FIG. 6 shows the wiper blade design for the vortex diode concept. The vortex diode VD cannot stop the flow completely. It offers an increased resistance to flow in one direction. Used in conjunction with a De Laval nozzle, it can provide a means for fine tuning the shock curves in compression verses rebound. Curves E and D of FIG. 8 show the anticipated response of a damper having a De Laval nozzle working in parallel with a mechanical check valve or vortex diode.

MECHANICAL CHECK VALVE (FIG. 7)

A mechanical check valve concept for the wiper blade is shown in FIG. 7. This concept offers damping in the preferred direction with damping relief or reduction in the opposite direction (check valve open). The size of the orifice can be adjusted to provide appropriate restriction and since the orifice is generally going to be of the sharp edge variety, it will have approximately power of 2 damping response with increasing velocity. Again, used in parallel with the De Laval nozzle, it can be of benefit in fine tuning the rebound verses compression response.

PASSIVE DAMPING CONTROL

As indicated earlier in our discussion, damper control is a desirable feature for bicycle suspension systems. For small bumps where the response of the frame is near the equilibrium point, a minimum amount of damping is desired, to maintain a supple "feel" and reduce the amount of forward energy lost. Energy stored in the spring on the up side of a bump can be returned to forward travel if the stored energy can be used to push down on the down side of the bump, re-accelerating the bike. For larger suspension movements (damper stroke) resulting from large bump impacts and near-resonant operations, a greater amount of damping is needed.

Figure 9A:
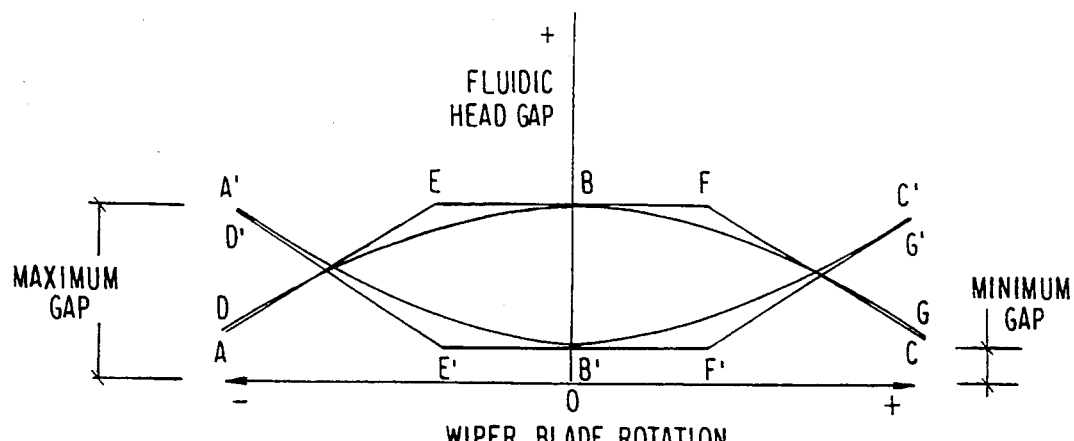
Figure 9B:
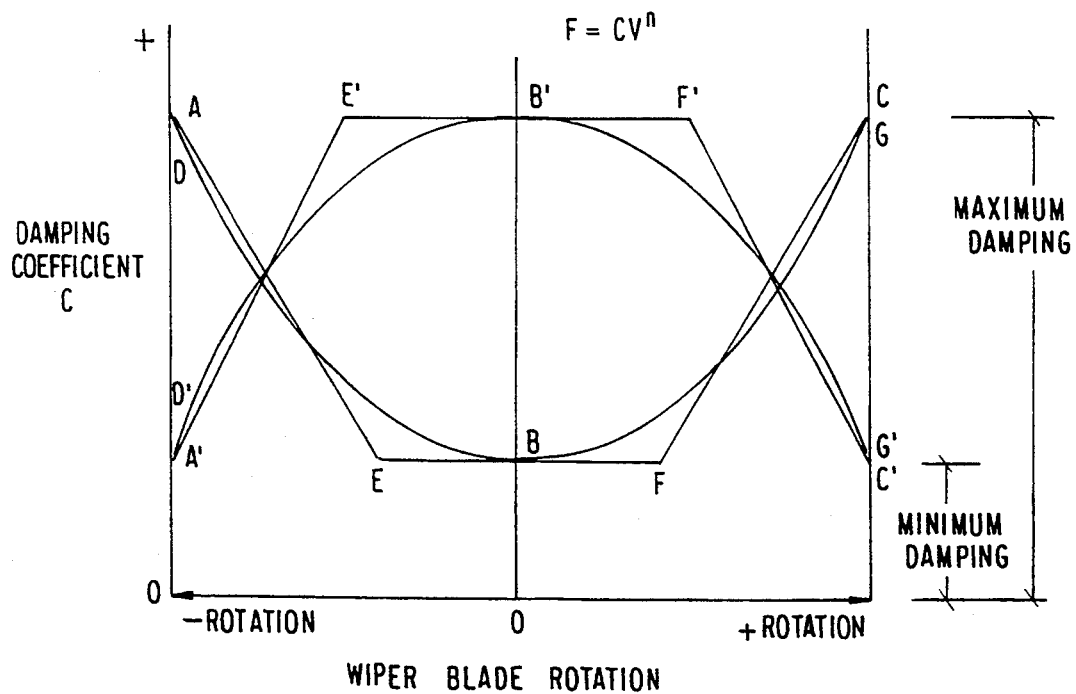
Figure 10:
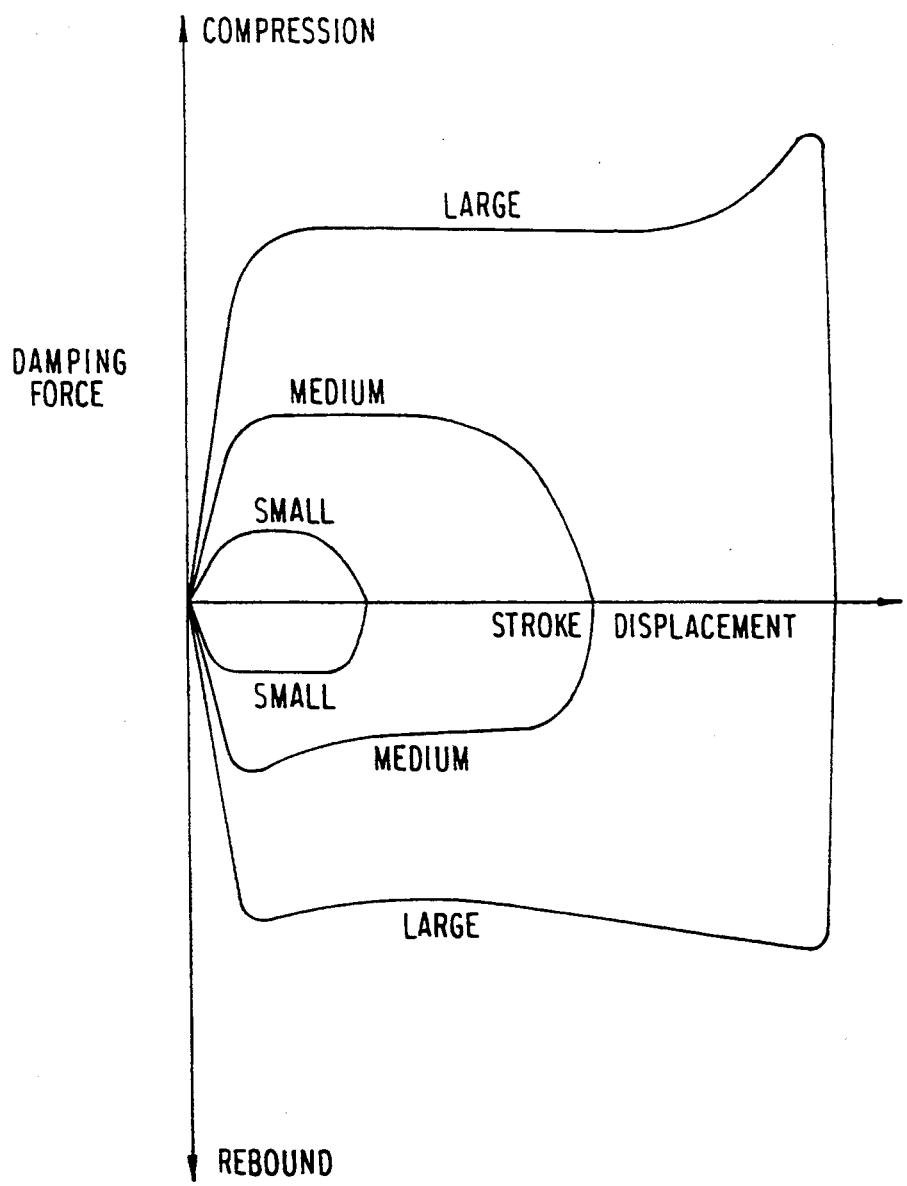

Passive damping control is achieved by making the damping characteristics stroke dependant. This is accomplished by shaping the wiping surface A-B-C-D (FIG. 3) so that the gap between this surface and the fluidic head changes with wiper rotation (stroke). FIG. 9a illustrates several embodiments. In this figure, the fluidic head gap is plotted versus the wiper blade rotation. Curve A-B-C, for example, shows one design with the gap increasing toward the center (neutral) position of the damper blade and a smooth transition between the extremes. This configuration gives higher damping rates at the extremes of the stroke and lower damping rates near the neutral position, as indicated by Curve A-B-C in FIG. 9b. This is the preferred concept for the preferred embodiment. FIG. 10 shows the expected damping force v.s. displacement curve for this design. The opposite effect is illustrated by Curve A'-B'-C' in FIG. 9a. For this design, the gap is small near the neutral zone and maximum at the extremes. The resulting damping curve is illustrated by Curve A'-B'-C' in FIG. 9b. The damping rates are now highest near the neutral point and lowest at the extremes. As one can readily see, virtually an infinite variety of damping characteristics can be designed into the damper unit for passive damping control.

Active damping control is also an important optional feature for bicycle suspension systems. An active system is needed to adjust for rider size and/or riding terrain.

ACTIVE DAMPING CONTROL

Active damping control can be provided by an adjustment screw or rotary or sliding valve assembly (not shown), manually or electrically operated, located in the shaft of the wiper blade unit or outside of the pressure cavity. The two ports of the valve, regardless of where the valve is situated, are each connected to the two pressure chambers of the pressure cavity, respectively and corresponds to the by-pass BP shown in FIG. 3. In the case of the valve mechanism being contained in the wiper shaft, the two ports could be drilled into the upper and lower faces of the wiper-piston, and angled toward the center of the wiper shaft, where the ports are separated by the adjustable valve assembly. This valve assembly is intended to operate as a bypass system for the De Laval nozzle.

The nature of the preferred embodiment is such that the pressure verses velocity curves for the intended ports and valve structure would behave much like the sharp edged orifice with the power of 2 relationship (Curve B, FIG. 8). The valve would be closed and the shock forced to operate in the De Laval mode (Curve C, FIG. 8) for example for a rough, high speed descent, where shock control of rapid multiple large displacement bumps takes precedence over energy conservation. For climbing, the valve would be open (Curve D, FIG. 8) to minimize the energy loss on the relatively small oscillations induced by the riders legs, allowing the springs to return as much energy as possible to the forward energy. Even with the valve open, a high velocity bump will cause significant shock resistance, as the passageways and sharp edge configuration of the valve and porting will limit the amount of bypass, forcing the De Laval tip to work. Of course the valve can also be partially closed (Curve E, FIG. 8), to give an intermediate response as desired by the rider. FIG. 3 is a schematic of the damper adjustment assembly.

OVER-PRESSURE SAFEGUARD

In the event of an excessive impact, the design of the shock with the non-contacting wiper assembly allows for an unusual pressure relief device. Unlike a conventional shock absorber, where flexible seal devices maintain contact with the sides of the container, under very high internal pressure generated by an extreme impact, the walls of the rotary shock will flex outward, creating a larger clearance between the walls and the wiper. This in turn will allow for greatly increased leakage and increased flow through the De Laval nozzle which will in turn help to reduce the high internal pressure.

APPLICATIONS

The rotary shock absorber may be used effectively in all four isolation units in a bicycle suspension system, 1) handle-bar, 2) saddle, 3) front and 4) rear wheels. The following describes the various applications.

Figure 11A:
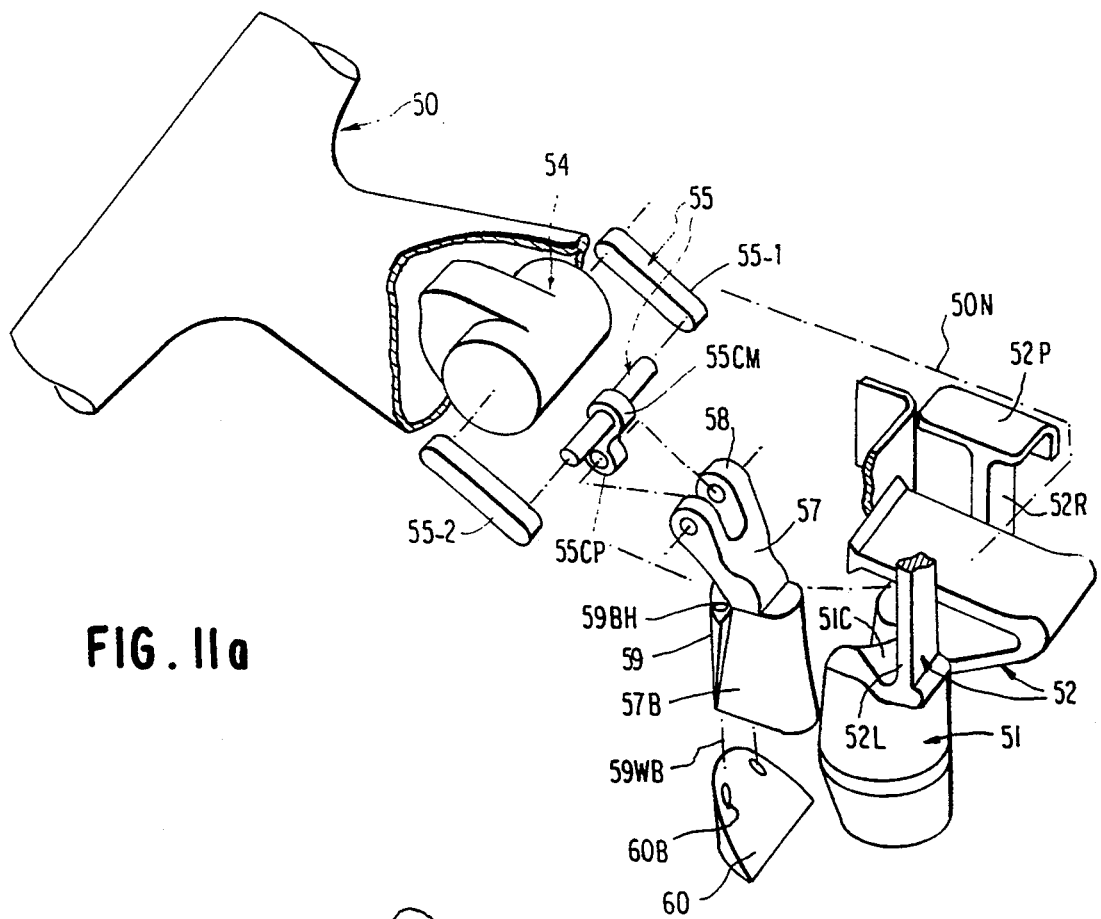
Figure 11B:
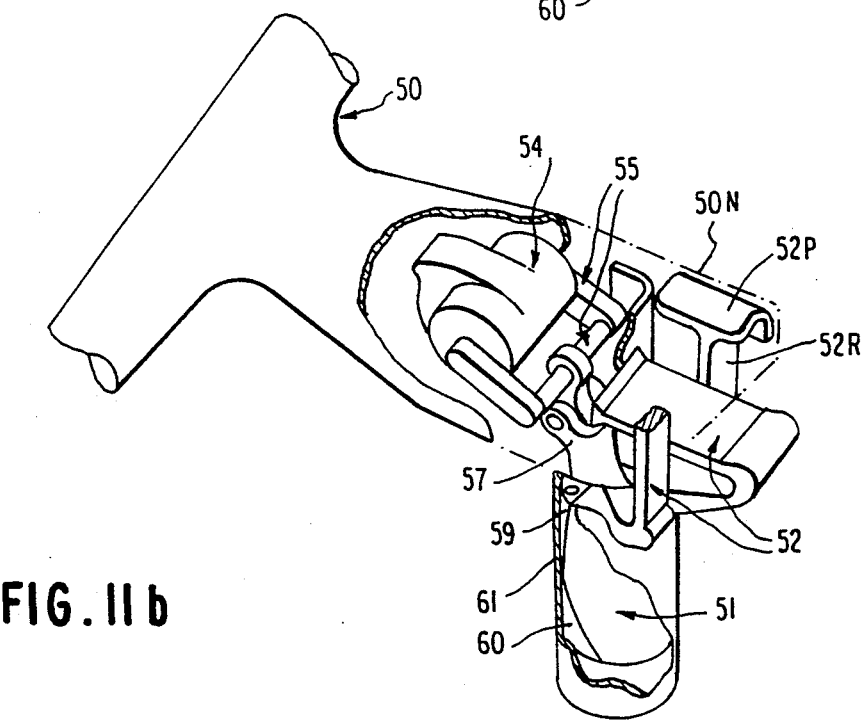

FIGS. 11A and 11B illustrates the rotary damper in a handlebar shock isolation unit. The unit includes a monolithic composite handle-bar and neck structure 50, handle-bar stem 51, multiple leaf spring 52, rotary damper 54 and the damper linkage 55.

The multiple leaf spring system 52 is comprised of an "X" spring integral with semicircular mounting base or stem portion 51. The X spring is comprised of two outer legs 52L and 52R, each of which is provided with a mounting armor pad 52P for securement to the overhanging portion of neck 50N (shown in dotted section) which also mounts and houses rotary damper assembly 54 and the actuating linkage system 55 coupled thereto. Linkage system 55 includes a pair of arms 55-1 and 55-2 which ends are secured to the outwardly extending shafts of the damper wiper and opposite ends secured to the coupler member 55CM. A link support member 57 has a bifurcated end 58 which is coupled to downwardly depending coupling member portion 55CP. The base 57B of link support 57 is shaped to next in cavity 51C of stem 51, and has a lower edge which cooperates with wedge 60 to secure the entire assembly in the steerer tube 61 of a bicycle. Stem tightener 59 has bolt hole 59BH through which pass wedge tightener bolts 59WB to engage threaded bores 60B in wedge 60. When these bolts are rotated, they draw the wedge 60 upwardly to lock the assembly in the steerer tube 61 and at the same time, draws stem tightener and base 57B in locking relation with stem 51 in head tube 61. In a preferred embodiment, head tube and bearing assembly shown in U.S. Pat. No. 5,002,297 is used. When a bump is encountered, the X spring 52 is loaded and the linkage 55 operates the rotary damper as described earlier.

Figure 11C:
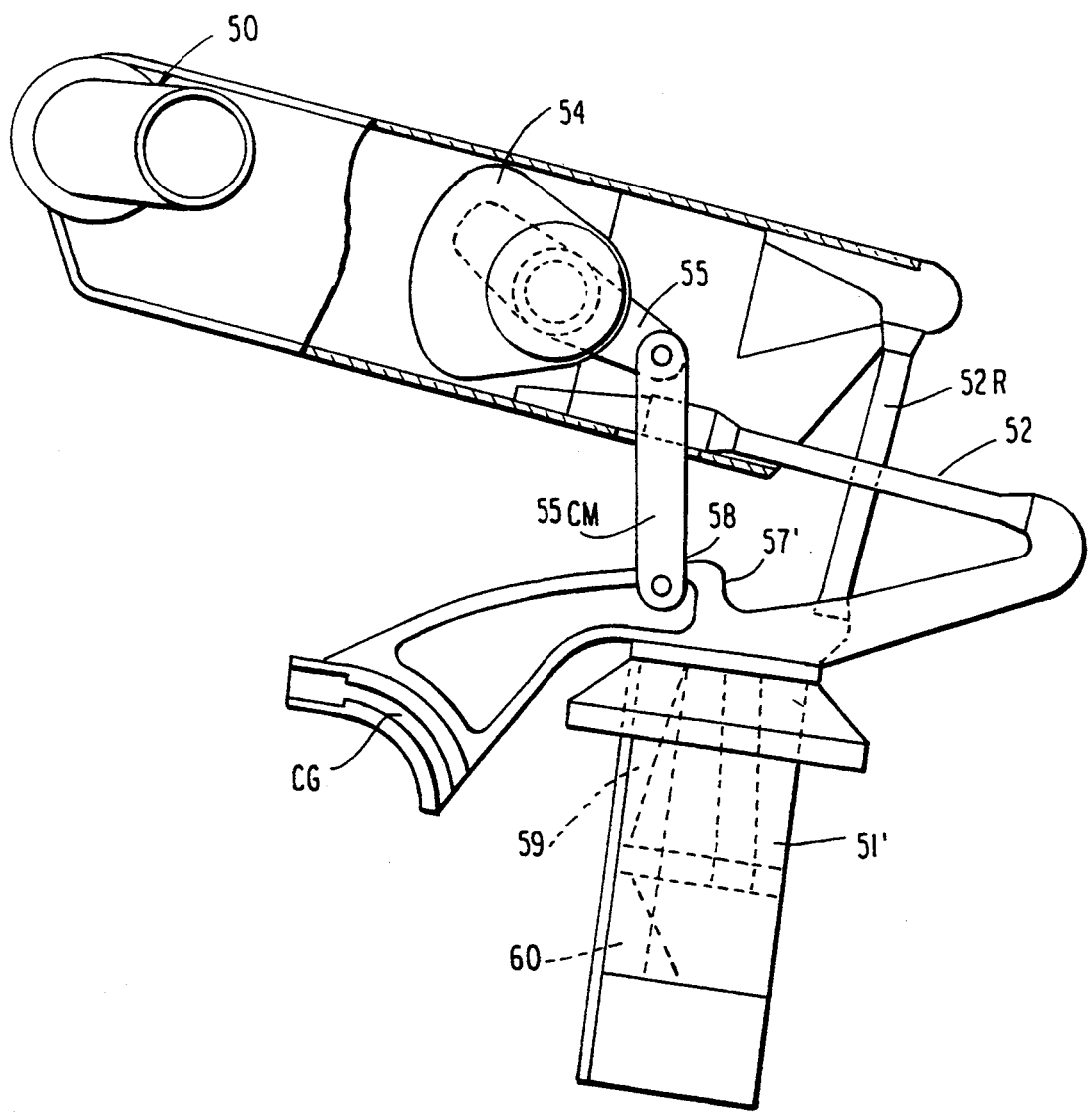

FIG. 11c is a partial sectional view of the handlebar suspension system. The ends of vertical springs 52L and 52R are secured (by adhesive or bolting) to the upper wall of neck 50N, which is integrally formed with handlebar 50. And the horizontal spring components 52 is similarly secured to the lower wall of hollow neck 50N. Base 51' may include an integrally formed cable guide CG.

Figure 12:
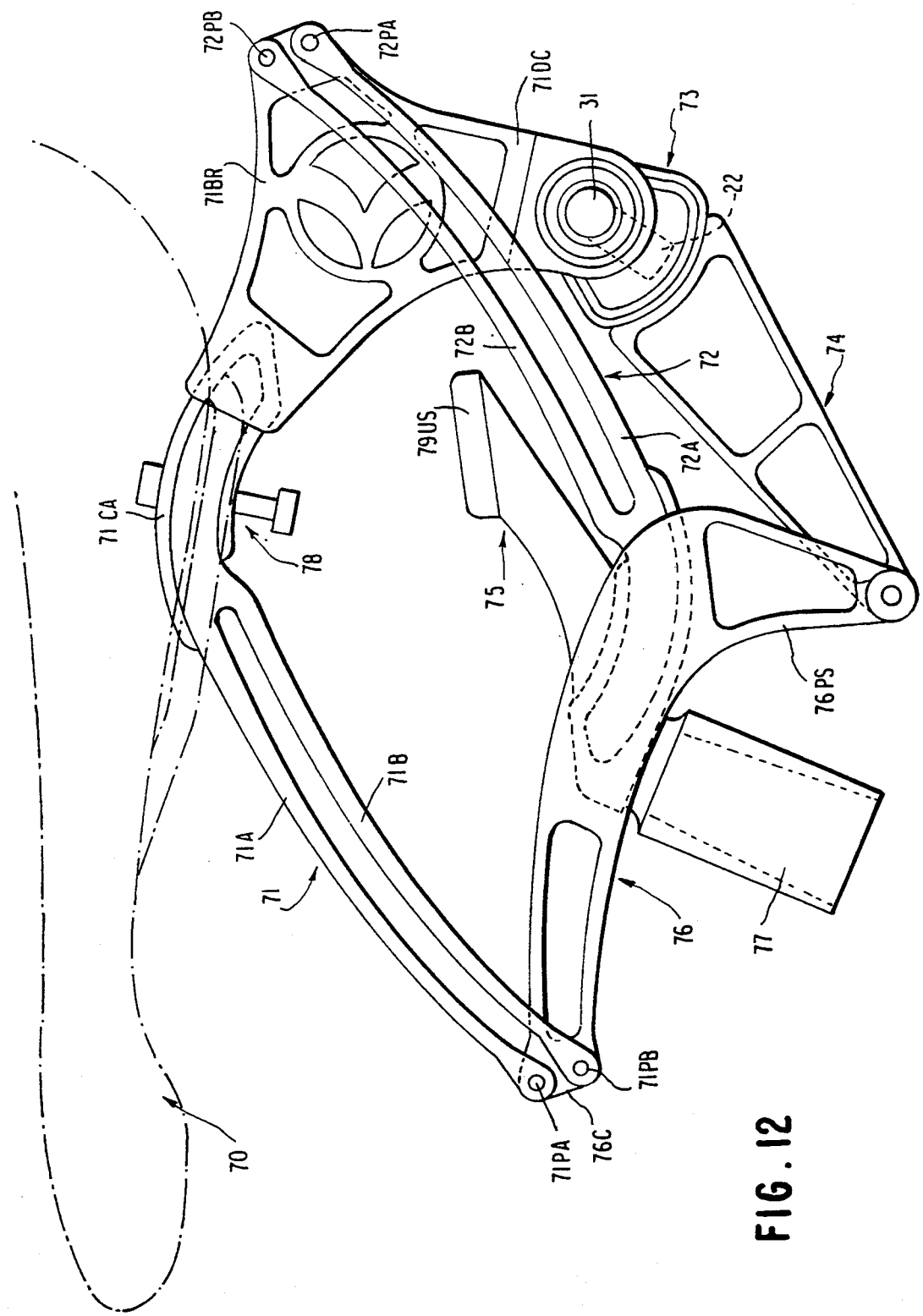

FIG. 12 illustrates the rotary damper in a seat or saddle shock isolation unit. The saddle shock isolation unit includes the saddle 70, two spring sets 71, 72, the rotary damper 73, the damper carrier linkage 74, overboard stop 79, the seat stem bracket 76 the seat stem 77, saddle clam 78. Spring 71 is bifurcated having flat spring legs 71A and 71B with pivot ends 71PA and 71PB, each pivotally coupled to the clevises forward end 76C of seat stem bracket 76. The trailing or aft end of spring 71 includes a rigid saddle clamping area 71CA, one or more rigid bracket members 71BR, and rotary damper coupler 71DC. Spring set 72 is formed with (or secured to) seat bracket 76 and has a pair of flat leaf springs 72A and 72B, which are banned in a direction opposite the low in springs 71A and 71B and has pivot ends 72PA and 72PB which are pivotally coupled to bracket 71BR. The outwardly extended shafts (30, 31) of the rotary damper 73 are secured to the rotary damper coupler 71DC. In the illustration, a pair of brackets 71BR with damper coupler portion 71DC are formed with or secured to the seat clamp portion 71CA. Portions of the bracket are removed to reduce weight and also can form trademark indicia of the manufacturer. The housing for damper 73 is secured to the end of damper linkage 74 with the opposite end of linkage 74 being pivotally connected to the downwardly depending pivot stub 76PS which is integrally formed with seat stem bracket 76. In order to avoid damage to the rotary damper 73 and other components, an overload stop member 79 extends upwardly from seat stem bracket to a position where on the bottom of the most vigorous shock, the saddle mounting bracket 78 will encounter the elastomeric padded upper surface 79US of overload stop 79US.

Figure 13A:
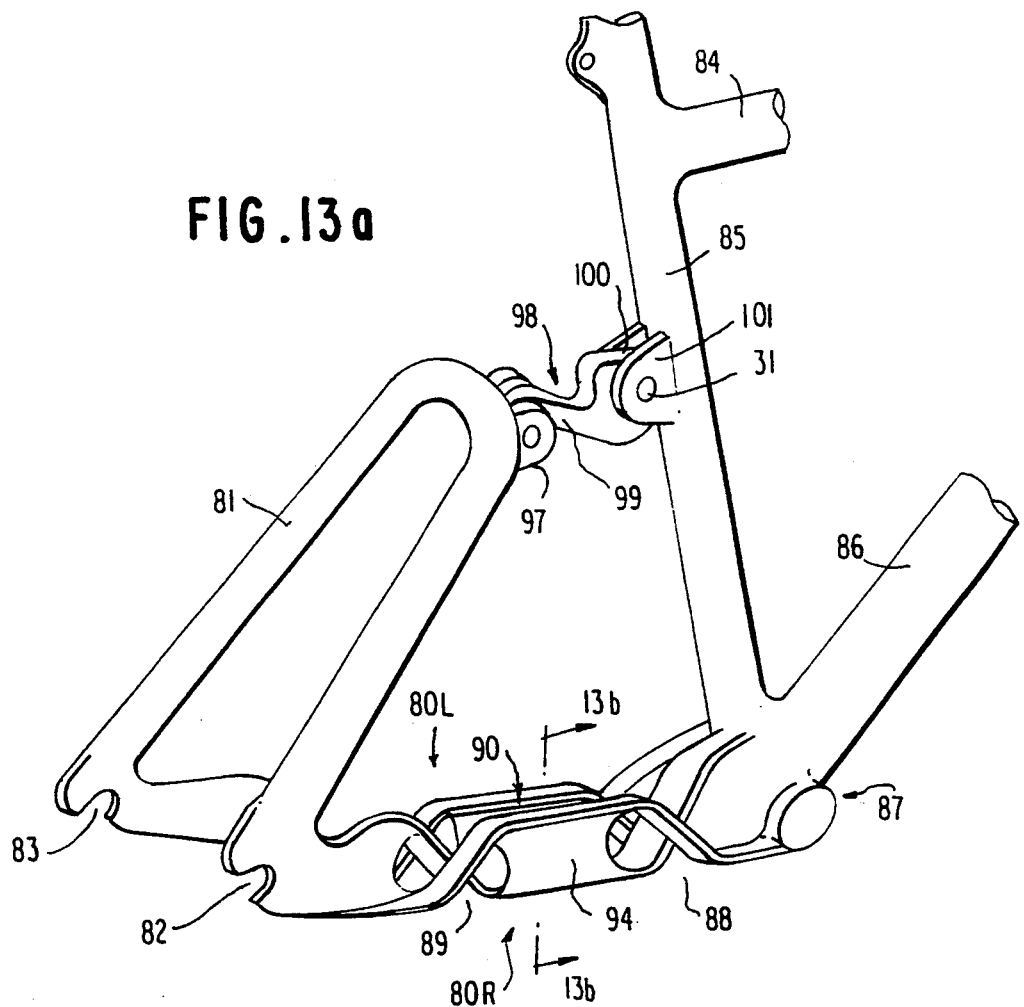
Figure 13B:
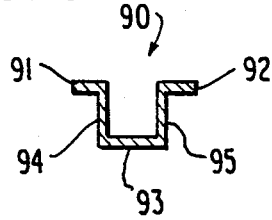
Figure 13C:
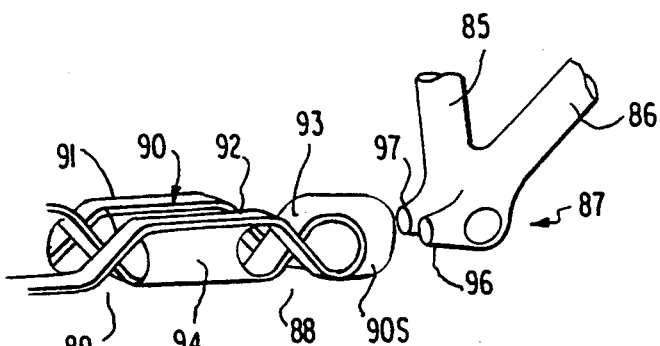

As shown in FIG. 13a, the rear suspension includes chainstays 80L and 80R, seatstay 81, rear dropout assembly 82, 83, which is formed of composite materials. Top tube 84 is welded to the upper end of seat tube 85 and down tube 86 is welded or secured to bottom bracket shell 87. The left and right chainstays, in this embodiment, are constituted by fore and aft "X" springs 88, 89 joined by a channel member 90 having a section shown in FIG. 13b. As shown in FIG. 13b, the channel has laterally extending horizontal flat members 91 and 92 coupled to a flat base member 93 by a pair of vertical plate members 94 and 95. The fore "X" spring section is constituted by extensions of the flat spring members 91 and 92 which are turned downwardly and fastened or adhered to the bottom bracket shell, and flat base spring member 93 is extended in a forward direction and turned upwardly crossing (e.g. forming an "X") between the two downwardly turned flat horizontal flat members 91 and 92 and is fastened to or adhered to the bottom bracket shell 87 and the down tube 85. Preferably, as shown in FIG. 13c, the trailing ends of the members 91, 92 and 93 are formed as a socket 90S to receive seatstay studs 96, 97 which are welded to the bottom wheel bracket 87.

The aft "X" spring section is similarly formed and secured to or formed with rear dropouts 82, 83. The seat stays 81 are illustrated as a "U" shaped tubular member secured to rear dropouts 82, 83. The "X" springs and channel members are very rigid to forces in a horizontal plane. Forces in the vertical plane are operatively absorbed by action of the "X" springs and the rotary damper. The upper end of the seat stay assembly 81 includes a pivot bracket 97 and a rotating damper link 98 has its aft end 99 pivotally connected to pivot bracket 97 and its fore end carrying the housing for rotary damper 100, the operating shafts 30, 31 being secured to clevis 101 which is welded to seat tube 85.

Referring now to FIG. 14, a front wheel suspension system is disclosed. A rigid front fork 110 has a steerer tube in head tube 111. Downwardly depending legs 112 and 113 are coupled to the trailing ends of left and right composite spring members 114 and 115 which have wheel dropouts 116 and 117 formed with or secured to the forward ends thereof. A rigid front fork member 118 having left and right legs 119 and 120 secured to dropouts 116 and 117, respectively, has bridge member 121 with a clevis 122 on the trailing side and a control cable guide 123 on the leading or front side. A rigid link 124 (having left and right legs 124L and 124R) has rotary damper 125 bonded or otherwise secured thereto. The laterally extending shafts 30 and 31 (FIG. 3) of rotary damper 125 are secured in lugs 128 which are welded to fork 110.

Composite springs 114 and 115 are similar. They include fore and aft "X" springs 130 and 131 which are joined by an arm member 132 which has an upper flat component 133 which turn downwardly at each end and a lower flat composite spring component 134 which is turned upwardly forming an "X" with the downwardly turned flat composite spring components 133. The trailing ends of these components can be shaped into a stud or stub for reception and securement in the lower ends of rigid depending legs 112 and 113 of front fork 110. A similar arrangement can be used in the leading "X" spring 130 and fork legs 119 and 120.

In this arrangement fork 110 is fixed relative to moving front fork 118. The "X" spring arrangement assures that the only movement of the wheel relative to the bicycle frame due to a bump in the direction shown by arrow so that the shock energy thereof will not be transmitted to the rider.

It is possible to incorporate plural cavities and wipers for the damper. For example, in a double wiper configuration, the smaller cavity would provide progressive fluid resistance along the variable nozzle, while the large cavity would also provide variable resistance during the compression stroke, but would incorporate a one way valve to allow free rebound. Thus, the small cavity with its distinct variable nozzle profile would be controlling the rebound, while both cavities would be used in controlling the compression stroke.

The only source of static friction in the isolation units are the small diameter rotary seals in the damper unit. The seals act at such a small lever arm that the net static friction is negligible. As the seal is rotary, the entrance and wear from dirt is much lower than with a sliding linear seal such as on a motorcycle front fork shock. This is a problem which has plagued many of the bicycle suspension front forks and other suspension pieces.

Shock body incorporating the other components of the suspension, made in aluminum or molded plastic. Dow Corning 200 series silicone oil is compressible and has low viscosity change with temperature (compared to other fluids). High temperature resistance is available in viscosities from 0.65 cs to 100,000 cs for virtually unlimited tuning. A preferred embodiment working range of 50 to 200 cs is envisioned.

If body is attached to other structure as mentioned, with good thermal contact, a very small and light shock unit will be able to take both high forces, and to dissipate a high heat load when necessary, without damage to the mechanism or fluid.

As rotary shock generates no net displacement, there is no extra nitrogen pressure chamber, foam, or spring mechanism needed to take up the displacement as it sweeps, unlike a standard piston type shock absorber.

LINEAR SHOCK

A linear shock can incorporate a number of the features of the rotary shock described above. Instead of a sliding seal, it may utilize a rolling bellows type of diaphragm to contain the working fluid and prevent contamination and wear without incurring static friction. The piston and shaft move on linear ball bearing tracks to greatly reduce static bearing friction in the unit. As the rolling diaphragm is unable to resist high pressure, the unit is comprised of an outer chamber with an air or nitrogen chamber, foam or additional spring loaded rolling bellows to take up the displacement as the shock is traveled. The unit has an internal high pressure cylinder constructed with variable wall inner diameter to allow for different damping levels at different portions of the stroke, a one way valve to allow higher compression damping than rebound damping, a piston including one or more of the same features as the rotary shock, including:

Dow Corning 200 series silicon oil, compressible fluid, low viscosity change with temperature, high temperature resistance, very low static friction, fluid logic, such as the preferred de laval nozzles, low exponent, fluid amplification, vortex diode, one way mechanical valve, no sliding contact resulting in zero or low friction.

LEAF SPRING

The tapered leaf spring is a well known design. It has the advantage that in addition to providing a spring function in a particular direction, unlike a conventional coil spring, it can also assist in controlling motion in additional directions. As the typical cross section of a leaf spring is flat, that is, it is much wider than it is tall, it is much more rigid in the side direction than in the spring direction. As such it can be used to control lateral or side motion. The leaf spring can also be used to control motion or provide rigidity along its length, at the same time. Thus it can provide not only the mechanical energy storage needed but also act as a portion of the articulation of the suspension. They are: light weight, simple design, multiple functions, and high energy capacity.

If the tapered leaf spring is made of a composite material utilizing high-strength fibers, it can achieve a much higher energy storage for a given size than a conventional steel spring. Glass fibers oriented longitudinally with the leaf spring and retained by a high strength matrix material such as epoxy, polyester, polycarbonate, nylon (polyamide), or polyimide can substantially outperform steel. If a spring is laminated with a center core of a high modulus, high strength fiber such as boron, silicon carbide or carbon, then covered with glass fiber on the outer layers, it can exhibit even higher properties than the straight glass fiber spring. This layering is set up so as to use each type of material to its best advantage, staying below its elongation limit. The desire is to not stress each type of material beyond its fatigue limit.

Another consideration is the linear properties of the leaf spring. As it is used for a linkage or articulation in the longitudinal direction, the spring properties in that direction should be addressed. One of the advantages of the layering of the different fiber materials has been that the linear properties of the spring can be improved substantially. Most of the energy storage of the spring occurs in the outer glass fiber layers, with the contribution of the higher modulus core layers such as carbon or boron contributing less than the glass fiber. In the linear direction, however, the core layers of high modulus material do a lot more. They can be a very important part of the springs linear stiffness and strength and stability. Carbon is especially strong for its weight in tension and boron is extremely strong and rigid in compression.

Due to the composite structure of the preferred embodiment leaf springs, the matrix materials have to be considered very carefully. A spring design that creates a high level of stress between adjacent layers of fiber in shear or in tension can cause them to separate. If the force between layers is less than the maximum that the matrix bond can hold, or if the stress is compressive in nature, then the spring can achieve the performance levels predicted by the high properties of the fibers.

An important feature of the leaf spring to the invention is that when it is used both as a spring and as an articulating member, the static friction can be made very low. The spring will be able to flex with very little hysteresis, and a small diameter pivot on the tip of the spring can provide a very low friction connection. Because the moment of the static friction of the pivot is very small, especially when compared to the spring length or moment, and the pivot is rotating through only a small angle, the static friction of the pivot can also be negligible.

X SPRING PIVOT

The X spring pivot incorporated into the preferred embodiment is a modification of the leaf spring. The pivot is different in that it applies cantilever torque to each end of the spring member, flexing the spring member in a uniform arc. The longitudinal spring member is a flat beam, with reinforced areas at either end. In order to keep the spring from moving out of position as it is being subjected to loads, there is at least one additional and usually two additional transverse springs (at approximately a 90 degree angle) to the first one adjacent to one or both sides. The midpoint and center of all of the springs lie along a straight line. Each set of springs keeps the other in proper orientation and allows the springs to resist compressive and off angle loads which would otherwise not be possible. The set of springs allow rotation essentially about the said straight line, as in a hinge. The design is inherently rigid in directions other than the rotating mode, and as there are no moving parts, there is no play or wear to compensate for.

The preferred embodiment of the spring pivot also uses the composite type of construction mentioned in the leaf spring description. The boron and or carbon core with a glass fiber outer layer greatly reinforces this spring against tension and compression loads. A given X spring pivot can be made lighter and more compact out of the preferred composite materials than for example, titanium or spring steel.

In order to resist tension and compression, as well as sideways bending loads to the best extent possible, it is desirable to create springs such that they are about straight when in the normal level loaded condition, or loaded slightly more than the normal level loaded condition. This means the springs will have optimum load capability and structural rigidity in the most common and useful orientation. This in turn means that the springs are made initially, under zero load, with a small reverse curve, that is curved into the direction of force. It is an unfortunate property of polymer bonded continuous fiber composites that the interlaminar properties (shear, tension and peel) for a beam made of sheets of unidirectional plies are a small fraction of the tensile and compressive properties of the composite. For example, a unidirectional composite made of carbon epoxy may exhibit tensile strength of 450 ksi, compressive strength of 249 ksi, and interlaminar shear of 14 ksi. Thus if a small radius reverse curved spring were to be highly loaded, the forces acting between each of the layers would simply tear the layers of the spring apart. In order for the spring to withstand a high level of load, it must be straight or curved in the direction of force. This places the inner layers of the spring into compression and the outer radius layers of the spring in tension, which works to hold the spring together. The composite leaf and X spring pivots used in the preferred embodiment have a small amount of reverse curve molded in (large radius) which becomes about straight as the spring is loaded to normal position. At the low level of loading involved through this deflection, the interlaminar properties are adequate. Typically, the maximum dynamic deflection of the composite spring will be about 3 to 5 times the normal loaded resting deflection.

The X spring pivot is most strong when the deflection is a relatively low angle. For high angular deflections, the spring must be made thinner, and the resulting high curvature in the highly deflected spring makes it geometrically less stable in addition to the reduced thickness of the spring plies. As a result, the X spring pivot is used where the rotation angle is inversely related to the loads which will be applied to the pivot. A highly loaded pivot should not be rotated a large amount, as a large rotation pivot should not be highly loaded. Of course, by making the spring plates longer, wider and thicker, the load bearing capacity of the X spring pivot will be increased for any particular rotation. As the spring pivot acts as both a torsion spring and as a rigid hinge pivot, it makes an excellent function for articulation of the suspension mechanism. It provides a useful suspension spring, and since there are no moving, rubbing or sliding parts, the static friction is essentially zero. This is an ideal characteristic for a superior suspension system. With the angular limitations of the X spring pivot, it can also be seen that relatively long linkages or swing arms should be used to still provide large suspension travel. It turns out this is just as well, as very short linkages give very non-linear suspension movement and otherwise complicate suspension design.

The development of the integral composite spring and pivot is useful in other area such as:

1) A cantilever brake set (not shown) using the X spring pivot as both return spring and caliper pivot. The rigid, frictionless design will provide a superior, chatter free stopping action. It will also provide precise return and allow the use of small clearance between the brake pad and rim. Current brakes need to use a relatively large spring force to overcome the variable friction in the pivots and still center the brake pads, in addition to the cable friction in the housing.

The X spring pivot is lower than the standard pivot, providing a more linear pad travel more perpendicular to the rim contact surface and reducing the tendency for the pads to "dive" or slip underneath the rim as the pads are used and wear occurs. This new pivot position by itself will reduce the leverage acting on the brake pads. The cantilever arm is envisioned being constructed of lightweight composite material, integrally molded with the X spring pivot. The arm will extend upward above the top of the tire, and the single actuating cable or other actuator will link the two cantilever arms together. The net result can be increased leverage over a traditional straddle cable design. In fact, the increased leverage is anticipated to allow use of smaller and lighter type derailleur cable and housing for the braking system. The key to using the lighter cable is increased leverage and increased cable travel, coupled with reduced cable tension or force. Of course a special brake lever needs to be incorporated in order to increase the cable travel and it could also use the X spring type of pivot for a smooth frictionless operation. The derailleur type of cable is very desirable because the cable has been designed with a rigid type of housing consisting of essentially linear wire strands imbedded in a plastic material. The plastic material holds the wires in relation to each other and holds the housing shape in place. The essentially (the strands may have a slight spiral twist) linear wire strands resist the compressive forces in the cable housing very rigidly, especially compared to the spiral wrapped wire housing conventionally used for bicycle brakes. The linear housing also includes a low friction plastic material liner to reduce cable friction and wear. The linear cable and housing is much lighter in weight than conventional spiral wrapped in the same size cable, and much lighter with the use of smaller cable.

For quick release of the wheel, a snug fitting bushing pivot in the standard cantilever pivot position with an adjustable inward stop is used. In normal use, there is no play in the snug bushing, and it rests against its inward stop. The bushing is not so snug that the cyclist cannot overcome its friction and after releasing the actuating device, swing the cantilever arm away from the rim, providing clearance to remove the wheel and tire. To reinstall, the cyclist Just pushes the cantilever arm back up against the stop, and reattaches the actuating cable or hydraulic actuator mechanism. There are different ways to attach a cable to these new brakes.

1. Incorporate a housing stop into one brake arm, and extend the cable to the other one.

2. Incorporate a housing stop on the fork, handlebar stem, frame, or suspension member and run the cable first to one brake arm or caliper and around a roller or other pivot assembly to the other brake caliper.

3. A conventional straddle cable will work.

Either of these first two methods allow for the brakes to be installed in tight fitting places where it is currently difficult to install standard brakes currently. The second one also allows for the bare cable to actuate the brake from an off center position, while still balancing the brake forces. This is especially advantageous in places such as the rear brake on a small frame, where the straddle cable type or U-brake or Cam operated type of brake is running into the seat tube, and the cable cannot be routed through the seat tube because of the seat post inside. The preferred embodiment can come around the side of the seat tube and provide a powerful and balanced design.

A different type of spring pivot brake is anticipated for the road version, replacing the traditional side pull type of brake.

2) Derailleurs designed around the X spring pivots can also offer the benefits of frictionless, precise performance. The springs will not be contaminated with dirt or moisture, and will not wear and develop play. Typical derailleurs currently work for about one season or less, before the many pivots wear to a point where the derailleur operation and performance is affected. The current derailleurs, like the brakes, must include sufficient spring force to overcome variable pivot friction, as well as operating the derailleur in the return direction. The X spring derailleur is envisioned as including both the derailleur spring and pivots in a one piece molded composite unit. There will be a hardened metal cage for wear resistance on the front derailleur, and bearing pulleys on the rear. All of these components being of one piece composite construction in the pivot areas, will be much lighter, more rigid and more accurate than conventional linkages. The rear derailleur will probably still incorporate a conventional pivot shaft and jockey cage assembly, as the X spring pivots do not easily lend themselves to large angular displacements. The parallelogram mechanisms using X spring pivots will be designed with longer moment arms than conventional linkages in order to provide more linear movement and smaller angular displacements.

While various preferred embodiments of the invention have been shown and described, it will be appreciated that numerous other adaptations and modifications of the invention will be readily apparent to those skilled in the art.

What is claimed is:

1. In a bicycle having a frame, handlebar-steering, seat front and rear ground engaging wheel assemblies attached to said frame of said bicycle, and a suspension unit, said suspension unit having a linkage, said linkage having at least one rotary shock absorber having an off-center cavity, working fluid filling said cavity and a rotary shaft and a vane element mounted on said rotary shaft, said off-center cavity having walls so that as said rotary shaft of said shock absorber is rotated, said vane element sweeps a path in said off-center cavity causing said working fluid to be displaced through at least one fluid control path selected from fluid metering gap, orifice or fluid logic device for resisting an applied rotary displacement and means mounting said suspension unit between said frame and at least one of said assemblies, said linkage having a plane normal to the axis of said rotary shaft and including said path of said vane, said linkage further comprising pivots and lever arms constructed so as to provide a high resistance to deflections out of a plane through the plane of said, and said linkage including one or more spring elements, said one or more springs having a spring rate which provides positive centering force to reposition the assembly to an equilibrium position from any other position.

2. The invention defined in claim 1 in which said one or more spring elements are selected from cantilever or leaf spring types, and in which the one or more springs are also acting as one or more of the lever arms of said linkage.

3. The invention defined in claim 2 in which said one or more spring elements constitute one or more of said pivots.

4. The invention defined in claim 2 in which said one or more springs are constructed of a high strength composite material having center and exterior layers and wherein said composite material is selected from the group comprising, fiberglass, high modulus fiber material, including boron or carbon fiber in the center layer of said one or more spring elements and a high strength lower modulus fiber material in the exterior layers.

5. The invention defined in claim 2 in which said one or more springs are constructed of a high strength composite material and wherein said composite material is selected from the group comprising, fiberglass, high modulus fiber material, including boron or carbon fiber in the center layer of said one or more spring elements and a high strength lower modulus fiber material in the exterior layers.

6. The invention defined in claim 1 wherein said fluid control path is a fluid metering gap positioned between said walls of said off-center cavity and the rotating vane element of said rotary shock absorber, said rotary shock absorber having a stroke, said metering gap changing cross-sectional area at different angles of rotation of said vane element in order to change the dynamic resistance of said shock absorber over said stroke.

7. The invention defined in claim 6 wherein said metering gap is reduced in the region of the said equilibrium position, increasing in dimension as the vane is rotated away from said equilibrium point.

8. The invention defined in claim 7 wherein said working fluid has significant compressibility and is silicone.

9. The invention defined in claim 6 wherein said seat having a maximum deflection, and said metering gap decreases in dimension towards the maximum downward deflection of said seat.

10. The invention defined in claim 1 wherein said vane element has a stroke and said shock absorber having a vane-type element sweeping an internal off-center cavity, including a pair of lateral extending shafts, two anti-friction bearings in which said shafts rotate, and a fluid metering gap between the vane element and the walls of said off-center cavity which fluid metering gap varies significantly in dimension over the stroke of said vane element and constitutes said fluid control path, said working fluid is hydraulic fluid, said vane element having a shaft protruding on both sides and rotary bearings supporting said shaft, said shaft being both a shaft supporting means for said vane element and operating said vane element in said shock absorber and being one of said pivots aiding in the control of the motion of said assembly and assisting in maintaining a predetermined orientation of one of said handlebar-steering, seat, front and rear ground engaging assemblies through its suspension travel and keeping said assembly from rocking, twisting or deflecting laterally or in any other way than in a fixed plane, and in which said one or more spring elements are selected from cantilever or leaf spring type springs, and in which the one or more springs act as one or more of the lever arms of said linkage controlling the displacement of one of said handlebar-steering, seat, front and rear ground engaging wheel assemblies, said one or more springs having exterior layers being constructed of a high strength composite material with a combination of high strength composite materials with a high modulus fiber material selected from boron and/or carbon fiber in the center layer of the spring and a high strength lower modulus fiber material in the exterior layers.

11. The invention defined in claim 1 wherein at least one of said one or more spring elements is an "X" spring.

12. The invention defined in claim 1 wherein said at least one of said one or more spring elements is a bifurcated flat leaf spring.

13. The invention defined in claim 1 wherein said working fluid is displaceable and said rotary shock absorber includes means for adjusting the rate of displacement of said working fluid as said rotary vane element sweeps in said off-center cavity.

14. The invention defined in claim 1 wherein said fluid logic device is a De Laval nozzle.

15. The invention defined in claim 1 wherein said spring element is a cantilever spring and said spring element and rotary shock absorber to provide suspension linkage and travel, energy absorption and return, and shock damping for said bicycle.

16. The invention defined in claim 15 wherein said cantilever spring constitutes one or more links in said linkage.

17. The invention defined in claim 15 wherein the shaft of said rotary shock absorber constitutes one or more of said linkage pivots.

18. The invention defined in claim 15 wherein said rotary shock absorber has a case and said cantilever spring is integrated with suspension and is attached to said case of said rotary shock absorber.

19. The invention defined in claim 15 wherein said cantilever spring acts as one leg or side of a parallelogram of trapezoidal linkage and said rotary shock absorber acts as another side allowing a basically pivoting suspension motion while maintaining essentially parallel or level orientation between a suspended member and an unsuspended member between one or more of said handlebar-steering, seat, front and rear ground engaging assemblies.

20. The invention defined in claim 15 wherein said cantilever spring constitutes one side of a parallelogram or trapezoidal linkage and actuating lever of said rotary shock absorber acts as the opposite side.

21. The invention defined in claim 15 wherein said cantilever spring has a loaded and an unloaded condition and is made of a composite with small reverse curve in the unloaded condition.

* * * * *